United States Patent
Chakkassery Vidyadharan et al.

(10) Patent No.: US 11,394,628 B1
(45) Date of Patent: Jul. 19, 2022

(54) MONITORING AND PERFORMANCE IMPROVEMENT OF ENTERPRISE APPLICATIONS

(71) Applicant: Equinix, Inc., Redwood City, CA (US)

(72) Inventors: Vishnu Prasad Chakkassery Vidyadharan, Sunnyvale, CA (US); Vaibhav Pralhad Bhosale, San Jose, CA (US); Loveneesh Bansal, San Jose, CA (US); Greg Alan Ogle, Highlands Ranch, CO (US)

(73) Assignee: Equinix, Inc., Redwood City, CA (US)

( * ) Notice: Subject to any disclaimer, the term of this patent is extended or adjusted under 35 U.S.C. 154(b) by 19 days.

(21) Appl. No.: 16/947,923

(22) Filed: Aug. 24, 2020

Related U.S. Application Data

(63) Continuation of application No. 15/824,861, filed on Nov. 28, 2017, now Pat. No. 10,756,990, which is a
(Continued)

(51) Int. Cl.
*H04L 43/04* (2022.01)
*H04W 72/00* (2009.01)
(Continued)

(52) U.S. Cl.
CPC .......... *H04L 43/04* (2013.01); *G06F 11/3433* (2013.01); *G06N 20/00* (2019.01); *H04L 67/10* (2013.01); *H04W 72/005* (2013.01)

(58) Field of Classification Search
CPC ......... H04L 43/04; H04L 67/10; G06N 20/00; G06F 11/3433; H04W 72/005
See application file for complete search history.

(56) References Cited

U.S. PATENT DOCUMENTS 6,704,874 B1   3/2004   Porras et al.
6,934,745 B2   8/2005   Krautkremer
(Continued)

FOREIGN PATENT DOCUMENTS

WO   WO-2019025944 A1 *   2/2019   ........... G06F 9/5072

OTHER PUBLICATIONS

Notice of Allowance from U.S. Appl. No. 16/779,130, dated May 26, 2021, 8 pp.
(Continued)

*Primary Examiner* — Jonathan A Bui
(74) *Attorney, Agent, or Firm* — Shumaker & Sieffert, P.A.

(57) ABSTRACT

This disclosure describes, in some examples, techniques for improving, adjusting, and/or optimizing the infrastructure of a network. This disclosure also describes techniques for monitoring a network using a ping utility integrated into the monitoring platform described herein at the application service level. This disclosure further describes techniques for monitoring database performance through data collected by, for example, database scripts that capture the response time for queries. In one example, this disclosure describes a method that includes collecting data associated with a plurality of service layers in a network, wherein at least some of the data is collected by a plurality of agents executing on a plurality of hosts within the network; correlating the data to an application executing across the plurality of service layers; identifying, based on the correlated data, a performance issue associated with the application; determining an action to address the performance issue; and performing the action.

20 Claims, 20 Drawing Sheets

Related U.S. Application Data continuation-in-part of application No. 15/712,525, filed on Sep. 22, 2017, now Pat. No. 10,558,541.

(51) Int. Cl.
*G06N 20/00* (2019.01)
*G06F 11/34* (2006.01)
*H04L 67/10* (2022.01)

(56) References Cited

U.S. PATENT DOCUMENTS

| | | |
|---|---|---|
| 7,627,671 B1 | 12/2009 | Palma et al. |
| 7,916,652 B1 | 3/2011 | Lima et al. |
| 7,962,633 B1 | 6/2011 | Sidebottom et al. |
| 7,984,073 B1 | 7/2011 | Basiago |
| 8,635,319 B1 | 1/2014 | Cuthbert et al. |
| 8,719,804 B2 | 5/2014 | Jain |
| 9,069,737 B1 | 6/2015 | Kimotho et al. |
| 9,449,278 B2 | 9/2016 | Davlos et al. |
| 9,479,414 B1 | 10/2016 | Rustad |
| 9,557,879 B1 | 1/2017 | Wang et al. |
| 9,712,410 B1 | 7/2017 | Char et al. |
| 10,050,851 B2 | 8/2018 | Medhi |
| 10,069,757 B1 | 9/2018 | Young |
| 10,127,146 B2 | 11/2018 | Moretto et al. |
| 10,127,273 B2 | 11/2018 | Dickey |
| 10,187,260 B1 | 1/2019 | Chen et al. |
| 10,200,252 B1 | 2/2019 | Qin et al. |
| 10,212,215 B2 | 2/2019 | Muraleedharan et al. |
| 10,223,131 B1 | 3/2019 | Lieberman et al. |
| 10,230,601 B1 | 3/2019 | Qin et al. |
| 10,237,149 B1 | 3/2019 | Guo et al. |
| 10,270,668 B1 | 4/2019 | Thompson et al. |
| 10,291,493 B1 | 5/2019 | Rustad et al. |
| 10,333,820 B1 | 6/2019 | Wang et al. |
| 10,355,912 B2 | 7/2019 | Deb et al. |
| 10,374,900 B2 | 8/2019 | Dujodwala et al. |
| 10,397,370 B2 | 8/2019 | Tak et al. |
| 10,409,920 B1 | 9/2019 | Harwood et al. |
| 10,462,004 B2 | 10/2019 | Hsiao et al. |
| 10,558,541 B1 | 2/2020 | Vidyadharan et al. |
| 10,756,990 B1 | 8/2020 | Vidyadharan et al. |
| 2003/0177228 A1 | 9/2003 | Vigouroux et al. |
| 2003/0212669 A1* | 11/2003 | Dedhia ............... G06F 16/358 |
| 2003/0225876 A1 | 12/2003 | Oliver et al. |
| 2005/0198275 A1 | 9/2005 | D'Alo et al. |
| 2006/0136582 A1 | 6/2006 | Mills |
| 2006/0242282 A1 | 10/2006 | Mullarkey |
| 2007/0008879 A1 | 1/2007 | Wallenius |
| 2010/0042723 A1 | 2/2010 | Sundarrajan et al. |
| 2011/0258621 A1 | 10/2011 | Kern |
| 2012/0167094 A1 | 6/2012 | Suit |
| 2013/0014107 A1 | 1/2013 | Kirchhofer |
| 2013/0159395 A1 | 6/2013 | Backholm et al. |
| 2013/0227116 A1 | 8/2013 | Radhakrishnan |
| 2013/0346899 A1 | 12/2013 | Cole et al. |
| 2014/0006955 A1 | 1/2014 | Greenzeiger et al. |
| 2014/0089339 A1 | 3/2014 | Siddiqui et al. |
| 2014/0342705 A1 | 11/2014 | Harris et al. |
| 2015/0006634 A1 | 1/2015 | Gong et al. |
| 2015/0195157 A1 | 7/2015 | Nayyar et al. |
| 2015/0358391 A1* | 12/2015 | Moon ............... G06F 11/34 709/224 |
| 2015/0378763 A1 | 12/2015 | Hassine et al. |
| 2016/0020955 A1 | 1/2016 | Bunch, Jr. et al. |
| 2016/0087859 A1 | 3/2016 | Kuan et al. |
| 2016/0087861 A1 | 3/2016 | Kuan et al. |
| 2016/0094422 A1 | 3/2016 | Poola et al. |
| 2016/0226731 A1 | 8/2016 | Maroulis |
| 2016/0314064 A1 | 10/2016 | Moretto et al. |
| 2017/0019312 A1 | 1/2017 | Meyer et al. |
| 2017/0181645 A1 | 6/2017 | Mahalingam et al. |
| 2017/0244607 A1* | 8/2017 | Dujodwala ............ H04L 12/42 |
| 2018/0004590 A1 | 1/2018 | Johnson et al. |
| 2018/0024901 A1 | 1/2018 | Tankersley et al. |
| 2018/0039516 A1 | 2/2018 | Biran et al. |
| 2018/0046510 A1 | 2/2018 | Boss et al. |
| 2018/0316581 A1 | 11/2018 | Okwii et al. |
| 2018/0341566 A1 | 11/2018 | Harutyunyan et al. |
| 2018/0349441 A1* | 12/2018 | Chen ............... G06F 16/24542 |
| 2018/0373580 A1 | 12/2018 | Ertl et al. |
| 2019/0095247 A1 | 3/2019 | Shimamura et al. |
| 2019/0222481 A1 | 7/2019 | Hira |
| 2019/0230015 A1* | 7/2019 | Lad ............... H04L 41/0631 |
| 2019/0265971 A1 | 8/2019 | Behzadi et al. |
| 2020/0004600 A1 | 1/2020 | Acker et al. |
| 2020/0019485 A1 | 1/2020 | Moradi et al. |
| 2021/0112017 A1 | 4/2021 | Gupta et al. |

OTHER PUBLICATIONS

Notice of Allowance from U.S. Appl. No. 15/712,525, dated Oct. 2, 2019, 9 pp.

Bansal et al., "Enterprise Monitoring Explained: How Monitoring the Enterprise Becomes an Opportunity for Greater Customer Satisfaction," blog.equinix.com, Mar. 7, 2017, 8 pp.

Prosecution History from U.S. Appl. No. 15/712,525, dated May 15, 2019 through Oct. 2, 2019, 14 pp.

Prosecution History from U.S. Appl. No. 15/824,861, dated Jan. 8, 2020 through Apr. 21, 2020, 39 pp.

U.S. Appl. No. 16/779,130, filed Jan. 31, 2020, naming inventors Vidyadharan et al.

* cited by examiner

MONITORING AND PERFORMANCE IMPROVEMENT OF ENTERPRISE APPLICATIONS

CROSS REFERENCE

This application is a continuation of U.S. patent application Ser. No. 15/824,861, filed on Nov. 28, 2017, which is a continuation-in-part of U.S. patent application Ser. No. 15/712,525, filed on Sep. 22, 2017. The entire content of each of these applications is hereby incorporated by reference.

TECHNICAL FIELD

This disclosure relates to computer networks, and more specifically, to monitoring, adjusting, and/or optimizing the performance of one or more aspects of the network.

BACKGROUND

Enterprise networks, especially large enterprise networks, require significant efforts to maintain and administer. Applications, processes, services, and other aspects of an enterprise application may, at times, exhibit poor performance and/or become inoperable. Identifying and diagnosing the cause of the poor performance or inoperability is often not easy. Some enterprise networks are configured to send alerts to network administrators when a performance issue arises, but such alerts are not always reliable or informative.

SUMMARY

Aspects of this disclosure describe techniques for improving, adjusting, and/or optimizing the infrastructure of a network. Techniques in accordance with one or more aspects of the present disclosure may involve data collected from various sources, including data provided by agents of nodes and/or resources within the network. By collecting and assembling data associated with applications and/or nodes in a correlated way, and applying machine learning algorithms to identify any excessive load on any particular resource or application, it may be possible to effectively address, improve, adjust, and/or optimize the infrastructure.

Further, aspects of this disclosure describe techniques for monitoring a network using a ping utility integrated into the monitoring platform described herein. Still further, this disclosure describes techniques for monitoring database performance through data collected by, for example, database scripts that capture the response time for queries. In some examples, information derived from collected data is displayed on user interfaces or dashboards.

In one example, this disclosure describes a method comprising collecting, by a computing system, data associated with a plurality of service layers in a network, wherein at least some of the data is collected by a plurality of agents executing on a plurality of hosts within the network, the plurality of agents including agents executing at each of the plurality of service layers; correlating, by the computing system, the data to an application executing across the plurality of service layers by determining that the application is associated with the data; and outputting, by the computing system, a user interface illustrating usage trends for each of a plurality of metrics associated with the application across each of the plurality of hosts within the network on which the application executes, wherein the user interface illustrates the usage trends for each of the plurality of metrics so that each of the plurality of metrics are visible to a user at the same time.

In another example, this disclosure describes a computing system comprising a storage system and processing circuitry that has access to the storage system and is configured to: collect data associated with a plurality of service layers in a network, wherein at least some of the data is collected by a plurality of agents executing on a plurality of hosts within the network, the plurality of agents including agents executing at each of the plurality of service layers; correlate the data to an application executing across the plurality of service layers by determining that the application is associated with the data; output a user interface illustrating usage trends for each of a plurality of metrics associated with the application across each of the plurality of hosts within the network on which the application executes, wherein the user interface illustrates the usage trends for each of the plurality of metrics so that each of the plurality of metrics are visible to a user at the same time.

In another example, this disclosure describes a non-transitory computer-readable storage medium comprising instructions that, when executed, configure processing circuitry of a computing system to: collect data associated with a plurality of service layers in a network, wherein at least some of the data is collected by a plurality of agents executing on a plurality of hosts within the network, the plurality of agents including agents executing at each of the plurality of service layers; correlate the data to an application executing across the plurality of service layers by determining that the application is associated with the data; output a user interface illustrating usage trends for each of a plurality of metrics associated with the application across each of the plurality of hosts within the network on which the application executes, wherein the user interface illustrates the usage trends for each of the plurality of metrics so that each of the plurality of metrics are visible to a user at the same time.

DETAILED DESCRIPTION

Figure 1A:
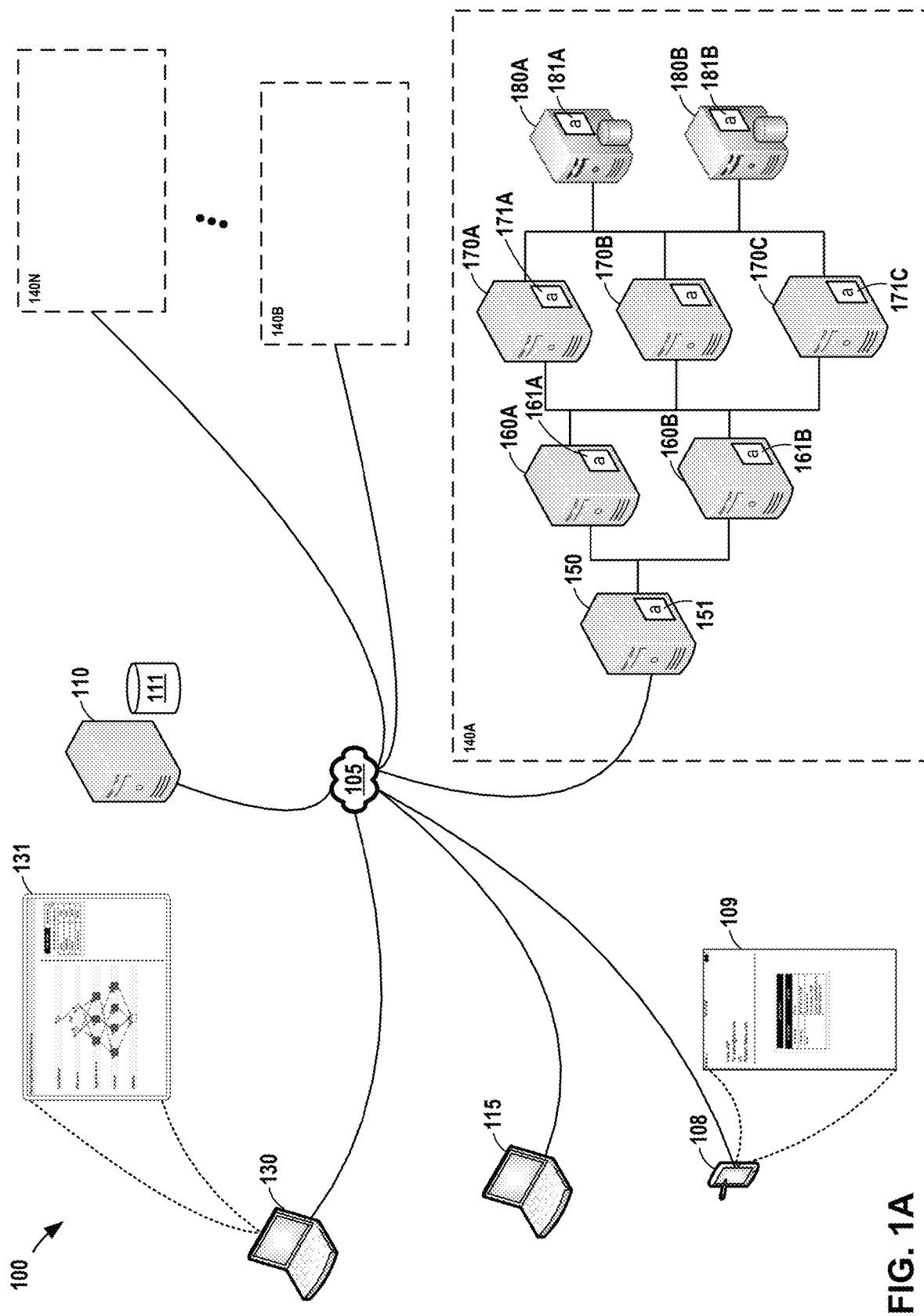
FIG. 1A and FIG. 1B are conceptual diagrams illustrating example systems in which one or more enterprise applications are executing in a computing environment, in accordance with one or more aspects of the present disclosure.

This disclosure describes, in some examples, a monitoring platform to provide integrated system that ingests, correlates, and provides alerts for monitored data relating to nodes, which may include applications, components (infrastructure), services, containers, and network components. In some examples described herein, monitoring of all the nodes, services, and applications is not only done independently, but is also performed by correlating the monitoring with other nodes, services, and applications. A hierarchy diagram format may be used to illustrate, in a user interface, services that correlate with other services, and that are monitored in a correlated way. For instance, techniques are described for monitoring a hierarchical system of one or more web servers, application servers, coherent servers, and database servers in a correlated way by pinging each component and evaluating the response. In some examples, a central unit for monitoring that uses a pull mechanism for collecting data is not necessary.

Systems described herein may monitor a wide range of nodes, which may include services, applications, and network components and their availability by, for example, not only checking endpoints, but also internal parameters and aspects of such nodes.

Systems described herein may also have the ability to analyze the impact of any outage by applying an intelligent algorithm for calculating the impact on services affected by any outage. If there is any outage in a node, for example, the algorithm will calculate its impact on the associated service, analyze the impact on the overall application, and analyze the impact on any other application associated with the node and the computing infrastructure. In this way, it may be possible to accurately assess the impact of any particular outage so that it can be dealt with accordingly.

In some examples, agents are deployed at the edges of the network and are initially configured to operate autonomously, although the agents can be controlled or configured in a remote and/or centralized manner. When an outage is detected, one or more agents may be configured to send an alert to a network administrator, without routing the alert or information underlying the alert through a centralized alerting system. Accordingly, alerts sent by the agents may be sent in a near or seemingly near real-time manner.

Agents may also be configured to automatically discover any new service starting on a host, and automatically add the new service to the network's service hierarchy, along with any corresponding flow of traffic. This process may be performed by requiring little or no human interaction, as most of the tasks performed by the agents are performed autonomously. User interfaces presented based on the network's service hierarchy may also be similarly updated in an automated fashion.

Automatic discovery of new nodes, services, and/or applications may involve application of rules, templates, discovery templates, and mapping templates. Rules are set of explicit or understood regulations or principles governing conduct within a particular activity. Templates are a set of rules, used so that the format does not have to be recreated each time it is used. Templates can be classified as either "discovery templates," or "mapping templates." Discovery Templates generally include several sets of rules that determine how the discovered new node/service will be classified. Mapping Templates generally include a set of rules that determine how the discovered new node/service will be mapped into a hierarchy diagram.

Accordingly, this disclosure describes, in some examples, techniques for monitoring a full range of the services and layers of applications deployed in an enterprise network, both monitored individually as well as with respect to each other. In some examples, the monitoring is done without requiring a central monitoring unit, which may reduce latency in performing the monitoring. In some examples, techniques for not only performing endpoint monitoring, but also for performing monitoring on components within the network, such as ports, URLs, processes, servers, network components, and containers.

This disclosure further describes an alerting platform in which an intelligent impact analyzer algorithm is used to provide not only alerts when an outage occurs, but also provide information about any services affected by the outage and its impact on the overall system. By using a decentralized approach for enterprise level monitoring using agents to monitor services deployed on the network, the monitoring can be performed independently without any single point of failure. The monitoring can also be performed remotely, while still being controlled or configured by an administrator or another configuration device if required. A number of different types of alerts are described, including near or seemingly near real-time alerts based on severity and/or priority and threshold-based alerts.

Also described are autonomous discovery techniques that enable the discovery of services across edges, and/or automatic detection of any new service in the hierarchy diagram along with the flow of traffic.

At least some prior art enterprise networks and applications are monitored using a centralized approach, which often lacks the capability to perform real-time alerting, typically because processing is required before the alert can be sent to a network administrator). Moreover, some enterprise monitoring systems only perform endpoint monitoring for all the services and applications deployed in the network. Such endpoint monitoring might only monitor outcomes, without regard to how any event impacts the system in a correlated way. Also, an event may affect a significant number of the services being provided, and there may also be a significant impact on the entire system, but endpoint monitoring systems might not provide useful information about such impacts. Also, in prior monitoring systems, when a new service is added, manual and tedious efforts are often required to deploy the new service, consuming significant administrator time and causing reduced efficiency. Often, with prior systems, it is very difficult, if not impossible, to monitor an entire system, including all its ports, services and applications, in one platform simultaneously.

Prior art monitoring systems sometimes use a centralized monitoring approach, which is often not only inefficient, but also lacked many capabilities for effective monitoring. In some cases, a centralized system architecture results in only a view (e.g., 20%) of the entire system, which makes monitoring all the nodes, services, applications and all other infrastructure simultaneously in a correlated way very difficult.

Further, prior art monitoring systems also tend to be unable to perform threshold-based alerting, and also unable to perform impact analyzing using an intelligent algorithm capable of providing intelligent alerts along with an assessment of the impact of the outage. Often, alerts sent by prior art systems were not prioritized appropriately, if at all.

Still further, prior art monitoring systems may also be based on a design that results in a single point of failure, meaning that if certain components are rendered inoperable, the whole alerting system is susceptible to being taken offline. This can lead to the dreadful situation where the alerting system is not providing any alerts for a significant outage.

Advantages realized by techniques described herein may include:

1) A user interface that provides a single pane of glass, providing a view of monitoring data for the applications across nodes, layers, services, and the like. Such a user interface may help reduce mean time to investigate (MTTI) and mean time to resolve (MTTR) issues, thereby improving the developer productivity and service quality.

2) A capability for monitoring services in a hierarchical fashion, thereby enabling a network administrator to monitor several layers of a service simultaneously. User interface elements can provide information can provide a dashboard of information about the status and upkeep of services without the need for manually checking all the services thoroughly, and thereby reducing significant time consumption in performing monitoring tasks.

3) Monitoring is performed not only at the endpoint of services but also services are monitored by the agents in an autonomous way with minimal human intervention. The monitoring is performed for some or the servers, networks, storage, and other components.

4) An intelligent impact analyzer algorithm is used to provide the impact of an outage on the whole system (i.e. the impact of any outage may provide the impact analysis relating to the service, as well the impact analysis relating to the overall application).

5) Autonomous agents are placed in or with the applications in a manner such that they are spread across the network in a decentralized way. The agents operate to check the availability of every service. In case of any outage, the agents act in an autonomous way to alert a network administrator without, in some cases, engaging a centralized system, and thereby efficiently communicating the alert.

6) Automatic discovery of new services and automatically determining the service's place in any hierarchical service structure, and any corresponding hierarchical user interface.

This disclosure also describes, in some examples, techniques for improving, adjusting, and/or optimizing the infrastructure of a network. Such techniques are performed using data collected from various sources, including data provided by agents of nodes and/or resources within the network. By collecting and assembling data associated with applications and/or nodes in a correlated way, and applying machine learning algorithms to identify any excessive load on any particular resource or application, it may be possible to effectively address improve, adjust, and/or optimize the infrastructure. For example, one possible remedial action involves adding or substituting nodes or resources to balance the resource distribution within a network.

This disclosure also describes techniques for monitoring a network using a ping utility integrated into the monitoring platform described herein at the application service level. In some examples, monitoring agents in the network may occasionally or continuously ping nodes to monitor their availability and performance.

This disclosure further describes techniques for monitoring database performance through data collected by, for example, database scripts that capture the response time for queries. In some examples, information derived from data collected in connection with those scripts are displayed on dashboards that identify queries taking longer than a threshold time.

Also, in some examples, dashboards are used to present information for a number of different types of fields or data points that are directly or indirectly associated with monitored services, and may enable or facilitate capabilities associated with performance optimization. For instance, a SQL Id dashboard may provide a histogram for SQL queries associated with one or more services, and the dashboard may identify queries taking longer than a period of time on the order of 20, 10, or 5 seconds. When poor performing queries are identified and pinpointed, the appropriate development or database administration team can address the identified latency using information presented by the dashboard or identified by the associated logic. If the latency is accurately identified, less time may be required to determine the cause of the latency and/or identify any bug that may be causing the performance deficiency.

In other examples, network performance optimization logic, based on data generated internally or by a third-party tool, may report the duration of various network operations performed by an application. If the duration of the network operation (e.g., round-trip time) is more than threshold time, the network operation(s) may be identified for further review and investigation, and associated information presented on a dashboard. In some cases, an alert may be sent to a monitoring team.

In other examples, techniques are described for improving, adjusting, and/or optimizing the performance of services, such as a web server service, by identifying web server requests that take longer than a threshold time. Such requests may be monitored at the browser, network, and/or server level. In response to identifying such requests, appropriate developer teams or other personnel may be notified of the potential performance issue or deficiency through alerts, dashboards, or otherwise. Other dashboards may be used for presenting information about other aspects of a network or the applications executing within the network, such as dashboards relating to CPU and memory utilization and user logins. Such dashboards may include one or more histograms to facilitate visualization and performance optimization.

Still further, techniques in accordance with one or more aspects of this disclosure may include intelligently managing resources through machine learning. In some examples, a machine learning algorithm performs predictive analysis and configures applications and/or services within the network to predict the need for increasing or decreasing various resources associated with applications and services. For instance, if there is excessive load on one resource by a service, and other resources can also be used for that service, those other resources may be allocated to the service to balance the load on the underlying resources. In this way, resource demand at peak hours can be met automatically without human intervention, and resources may be conserved at other non-peak times.

In general, for a network or computing infrastructure that spans multiple geographic areas, consumption may be elastically adjusted during peak hours for each geographic region, and conserved during non-peak hours for each region. Further, techniques described herein may provide a "single pane" user interface, capability to navigate to individual tools in the network ecosystem for in-depth analysis, proactive alerting, cost reduction through resource redistribution and conservation, wide-ranging visualization, and improved performance (which may lead to a favorable click-to-dollar ratio).

Aspects of this disclosure relate to U.S. patent application Ser. No. 15/712,525, filed on Sep. 22, 2017, which is hereby incorporated by reference herein in its entirety.

Figure 1B:
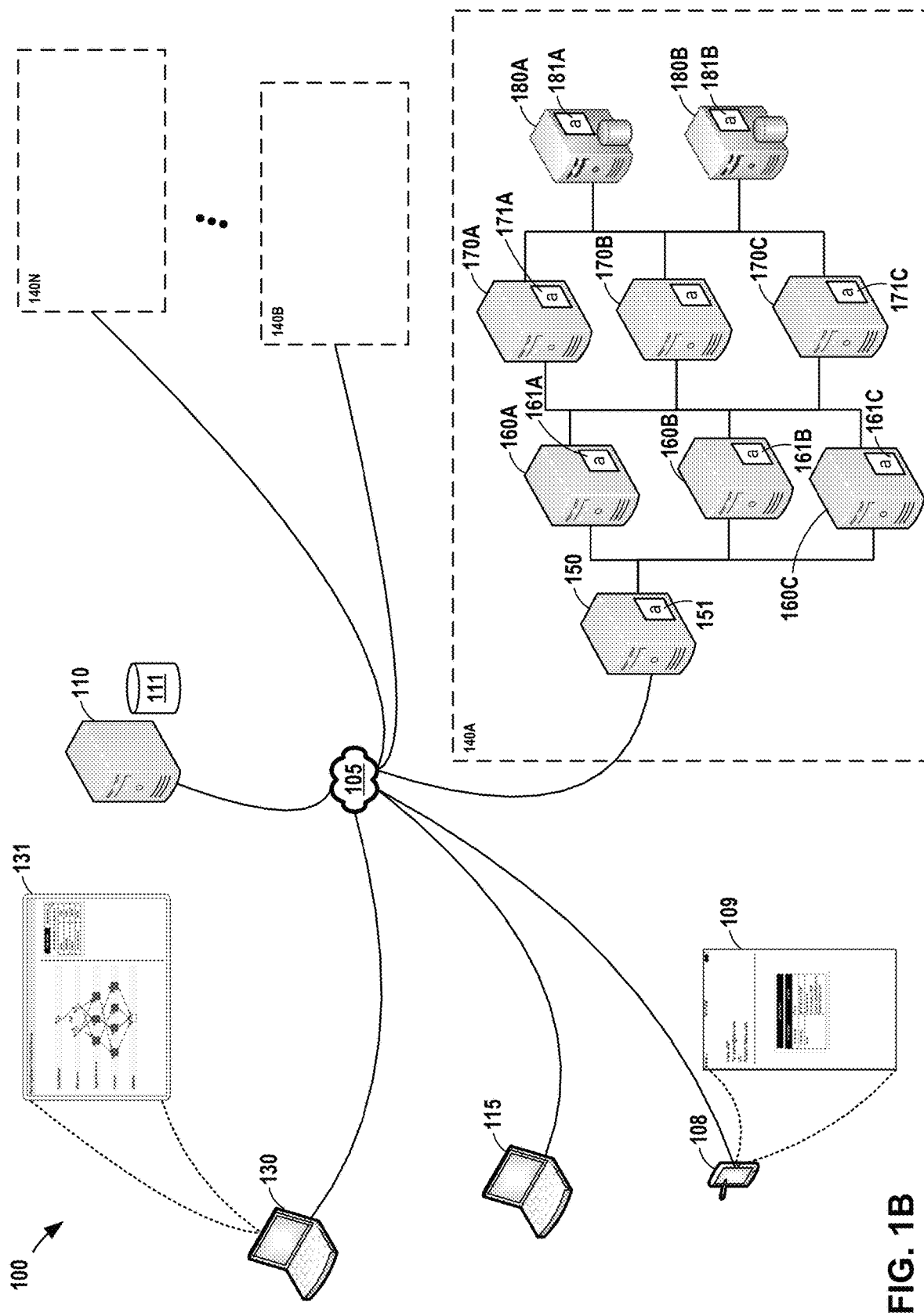

FIG. 1A and FIG. 1B are conceptual diagrams illustrating example systems in which one or more enterprise applications are executing in a computing environment, in accordance with one or more aspects of the present disclosure. In the example of FIG. 1A, system 100 includes one or more mobile devices 108 and one or more client devices 115 connected, via network 105, with data center stacks or data center platforms 140A through 140N. Each platform 140A through platform 140N may represent a collection of hardware devices, software components, and/or data stores that can be used to implement one or more applications or services within a data center or across data centers.

In this disclosure, platform 140A through platform 140N may be collectively referred to as "platforms 140," and may represent any number of platforms. Similarly, for other components, devices, modules, or other items that are illustrated or described herein using a similar numbering and letter convention, such components, devices, modules, or items may correspondingly be referred to collectively in a similar fashion, and may represent any number of such components, devices, modules, or items.

Each of platforms 140 may include one or more physical or virtual computing devices. In the example of FIG. 1A, platform 140A includes load balancer 150, web servers 160, application servers 170, and databases 180. Platform 140B through platform 140N may be similarly configured, although for ease of illustration, no devices are shown within platform 140B through platform 140N in FIG. 1A or FIG. 1B. In FIG. 1A, one load balancer 150 and two web servers 160 are shown within platform 140A, although in other examples, any number of load balancers 150 and web servers 160 may be used. Similarly, in the example of FIG. 1A, application servers 170 includes application server 170A, application server 170B, and application server 170C. In other examples, a different number of application servers 170 may be deployed. Further, the illustration of FIG. 1A includes database 180A and database 180B, but a different number of databases 180 may be used in other examples. FIG. 1B corresponds to FIG. 1A after the web server 160C has been deployed within platform 140A.

In both FIG. 1A and FIG. 1B, system 100 further includes central monitoring system 110. As described herein, central monitoring system 110 performs functions relating monitoring, criticality assessment, and/or performance management for system 100 in accordance with one or more aspects of the present disclosure. Central monitoring system 110 interacts with one or more monitoring agents that are deployed within platforms 140. In many examples, central monitoring system 110 is logically, physically, and/or conceptually deployed "centrally" within system 100, and is thus described herein as a "central" monitoring system. However, in other examples, central monitoring system 110 may be deployed in a manner not considered "central," and thus, central monitoring system 110 (and similarly labeled systems) may encompass monitoring systems not literally encompassed by the term "central monitoring system."

Monitoring agents may monitor the operation and/or resource usage of various nodes within platforms 140. Monitoring agents may also monitor activity and/or communications between platforms 140 within system 100, and/or otherwise within system 100. As used herein, a "node" refers to any device, component, or system capable of being monitored, including load balancers, servers, ports, URLs, applications, processes, interfaces between applications or processes, containers, virtual machines, databases or data stores, network components, or other components illustrated in the figures.

One or more nodes may be included within platforms 140. Such nodes or platforms may include virtual and physical computing devices. In some examples, each virtual or physical computing device may include a monitoring agent. For example, as shown in the example of FIG. 1A, load balancer 150 includes monitoring agent 151, which is a module that monitors one or more aspects of load balancer 150. Similarly, monitoring agents 161 (monitoring agent 161A and monitoring agent 161B) execute on web server 160A and web server 160B ("web servers 160") and monitor one or more aspects of web servers 160. Monitoring agents 171 execute on application servers 170 and monitor one or more aspects of application servers 170. Monitoring agents 181 execute on databases 180 and monitor one or more aspects of databases 180. In some examples, each of monitoring agent 151, monitoring agents 161, monitoring agents 171, and/or monitoring agents 181 run on a low-level computing infrastructure of platform 140A that provides computational resources to execute applications. In other words, one or more of monitoring agent 151, monitoring agents 161, monitoring agents 171, and/or monitoring agents 181 may execute on a bare-metal host device, a virtual machine, a container, or the like.

An additional client device 130 illustrated in FIG. 1A and FIG. 1B may be operated by a network administrator. In some examples, client device 130 may present one or more user interfaces 131, providing information, visibility, and services relating to and/or facilitating monitoring of aspects of system 100.

In the example of FIG. 1A, platform 140 may provide services to users of one or more client devices 115. For instance, in the example of FIG. 1A, network 105 receives a signal originating from a client device (e.g., client device 115) operated by an end user, and directs the signal to load balancer 150. Load balancer 150 detects a request over network 105 originating from client device 115. Load balancer 150 determines that the request specifies a network address or URL. Load balancer 150 load balances the request to one of web servers 160, such as web server 160A. Web server 160A analyzes the request and directs the request to one of application servers 170, based on the service associated with the request. In one example, web server 160A directs the request to application server 170B. Application server 170B processes the request by performing computing operations called for by the request. In some examples, application server 170B may process the request through execution of one or more microservices, virtual machines, or containers executing on application server 170B. Application server 170B responds to the request by sending a responsive signal through one or more of web servers 160 (e.g., web server 160A), through load balancer 150, and over network 105 to the originally-requesting client device 115.

In accordance with one or more aspects of the present disclosure, central monitoring system 110 may gather information about system 100 from one or more sources. For instance, in some examples, central monitoring system 110 may collect information about system 100 based on user input. In the example of FIG. 1, central monitoring system 110 detects input over network 105 that it determines corresponds to a signal from client device 130. The signal may correspond to input from a user of client device 130, operated by a network administrator configuring central monitoring system 110. Central monitoring system 110 determines that the signal includes information about system 100. Central monitoring system 110 further determines that the signal includes a description of the structure, arrangement, hierarchy, and/or configuration of one or more platforms 140. In the example of FIG. 1, the information specifies that for platform 140A, load balancer 150 load balances service requests received over network 105 to two web servers 160 (e.g., web server 160A and web server 160B). The information further specifies that platform 140A includes three application servers 170 and two databases 180. The information may also contain information about nodes, including ports, URLs, processes, applications, servers, virtualized computing instances (e.g., virtual machines and containers) executing on one or more computing devices within platform 140A, and other information. Similarly, the information may include information about nodes included within other platforms 140, including platform 140B through platform 140N. Central monitoring system 110 may store some or all of the information in data store 111.

Alternatively, or in addition, central monitoring system 110 may gather information about system 100 based on information received from one or more components or computing devices within system 100. For instance, in the example of FIG. 1A, one or more monitoring agents executing on load balancer 150, web servers 160, application servers 170, databases 180, and/or other computing devices may send one or more signals over network 105. Central monitoring system 110 may detect one or more signals, and determine that the signals correspond to information about the configuration of platform 140A. The information may describe the structure, arrangement, hierarchy, and/or configuration of the nodes within platform 140A. Central monitoring system 110 may also detect one or more signals over network 105 and determine that the signals correspond to information about the configuration of platform 140B through platform 140N. The information received by central monitoring system 110 may be in response to a query issued by central monitoring system 110 over network 105, or may be independently reported by devices, components, computing devices of platforms 140, and/or monitoring agents executing on such devices, components, and/or computing devices. Central monitoring system 110 may store some or all of the information in 111.

Central monitoring system 110 may make a criticality assessment of components of system 100. For instance, in the example of FIG. 1A, central monitoring system 110 may use information stored within data store 111 to determine the hierarchy of the nodes and/or components and systems included within each of platforms 140, and relationships between various such nodes, components, and systems. Central monitoring system 110 may determine, for example, that since platform 140A includes two web servers, each of web servers 160 shares 50% of the load balanced by load balancer 150. If one of web servers 160 were to become inoperable, the functions performed by each of the web servers 160 would be impacted at a rate of 50%. Accordingly, in some examples, central monitoring system 110 may determine that each of web servers 160A and web server 160B has criticality factor of 50%. In another example, if there were three web servers 160 within platform 140, central monitoring system 110 may determine that each of web servers 160 has a criticality factor of 33%. For four web servers 160, central monitoring system 110 may determine that each of web servers 160 has a criticality factor of 25%. Similarly, central monitoring system 110 may make criticality assessments for other nodes and/or devices within platform 140A, such as load balancer 150, application servers 170, and/or databases 180. In addition, central monitoring system 110 may perform similar criticality assessments for components and/or devices within each of platforms 140 illustrated in FIG. 1A.

Central monitoring system 110 may configure one or more monitoring agents executing on computing devices associated with platforms 140. For instance, in the example of FIG. 1A, central monitoring system 110 may output a signal over network 105. Monitoring agent 151 executing on load balancer 150 detects a signal over network 105. Monitoring agent 151 determines that the signal includes information about what aspects of load balancer 150 to monitor and/or how and when to report status changes, such as error conditions, resource utilization changes, and other changes associated with load balancer 150 or any processes, applications, or virtual computing instances executing on load balancer 150. Monitoring agent 151 may store, at load balancer 150, some of all of the information received from central monitoring system 110. In a similar manner, central monitoring system 110 may communicate configuration information to one or more other monitoring agents associated with other nodes or computing devices within platform 140A, such as web servers 160, application servers 170, and/or databases 180. Central monitoring system 110 may also communicate configuration information one or more monitoring agents 151 associated with devices, components, and/or computing devices within other platforms 140, including platform 140B through platform 140N.

Alternatively, or in addition, central monitoring system 110 may communicate information about the criticality assessments to one or more monitoring agents executing on computing devices associated with platforms 140. For instance, in the example of FIG. 1A, central monitoring system 110 may output a signal over network 105. Monitoring agent 171A executing on application server 170A detects a signal over network 105. Monitoring agent 171A determines that signal includes information about the criticality of application server 170A and/or one or more nodes, components, ports, URLs, processes, applications, or virtualized computing instances executing at application server 170A. Monitoring agent 171 may store some or all of the information received from central monitoring system 110 so that monitoring agent 171 has access to information about its own criticality. In a similar manner, central monitoring system 110 may communicate information about the criticality of other components, devices, and/or applications of platform 140A to monitoring agents executing within platform 140A. Further, central monitoring system 110 may also communicate information about the criticality of components, devices, and/or applications of other platforms 140 (e.g., platform 140B through platform 140N). In this manner, some or all monitoring agents within system 100 are provided with information sufficient to determine or assess the criticality of some or all of the components, devices, and/or applications within system 100.

One or more monitoring agents may execute on computing devices within system 100 and monitor nodes within platforms 140. For instance, in the example of FIG. 1A, monitoring agent 151 monitors various aspects of load balancer 150, including ports, URLs, processes, and any applications, and/or virtualized computing instances that may be executing on load balancer 150. Similarly, monitoring agent 161A and monitoring agent 161B monitor various aspects of web server 160A and web server 160B, respectively, including ports, URLs, processes, applications, and/or virtualized computing instances that may be executing on each of web servers 160. Similarly, monitoring agent 171A, monitoring agent 171B, and monitoring agent 171C monitor various aspects of application server 170A, application server 170B, application server 170C, respectively, including ports, URLs, processes, applications, and/or virtualized computing instances that may be executing on each of application servers 170. Further, monitoring agent 181A and monitoring agent 181B monitor various aspects of database 180A and database 180B, respectively, including ports, URLs, processes, applications, and/or virtualized computing instances that may be executing on each of databases 180.

One or more monitoring agents may detect a status change and determine whether to send an alert based on the criticality of the nodes, components and/or devices undergoing the status change. For instance, in the example of FIG. 1A, monitoring agent 171C detects a change in the operation of application server 170C, which may include a system error, an error condition, a change in CPU, memory, or other resource utilization, or any other change. Monitoring agent 171C determines, based on the criticality information received from central monitoring system 110, the criticality or importance of the status change. In some examples, monitoring agent 171C may determine, based on the criticality or importance of the status change detected by monitoring agent 171C, that an alert should be sent to a network administrator to report the status change. In other examples, monitoring agent 171C may determine, based on the criticality or importance of the status change detected by monitoring agent 171C, that the status change is not sufficiently important or has such a small impact on the network that no alert should be sent to report on the status change. In either case, monitoring agent 171C may store or log information about the status change at application server 170C. Further, in either case, monitoring agent 171C may cause application server 170 to send information about the status change over network 105 to central monitoring system 110. Central monitoring system 110 may receive the information and store or all of the information about the status change in data store 111.

In examples in which monitoring agent 171C determines that an alert should be sent, monitoring agent 171C may send information to mobile device 108 about the status change. For instance, in such an example, monitoring agent 171C causes application server 170C to output a signal over network 105. One or more devices, such as mobile device 108, detects a signal over network 105. Mobile device 108 determines that the signal includes information sufficient to present a user interface. Mobile device 108 uses the information to present user interface 109 at a display device associated with mobile device 108. In the example shown in FIG. 1A, user interface 109 includes information about the status change detected by monitoring agent 171C at application server 170C.

Client device 130 may display a user interface that provides a hierarchical and/or dynamic view of the status of nodes and other components of one or more platforms 140. For instance, in the example of FIG. 1A, client device 130 may detect input that it determines corresponds to a user's or network administrator's request to display information. Client device 130 outputs a signal over network 105. Central monitoring system 110 detects a signal and determines that the signal corresponds to a request to display information about the status of one or more nodes, components, and/or computing devices within platform 140A. Central monitoring system 110 accesses information within data store 111. Central monitoring system 110 sends a response over network 105 that includes information derived from the accessed information in data store 111. Client device 130 detects a signal corresponding to the response and determines that the signal includes information sufficient to generate a user interface. Client device 130 generates user interface 131 and presents it at a display device associated with client device 130. User interface 131 may present a hierarchical view of platform 140A, presenting information in terms of service layers of platform 140A. User interface 131 may present information including status indicators identifying the state of each of the nodes with in platform 140A. The information presented within user interface 131 may be current information, and may be near or seemingly-near real-time information.

In some examples, central monitoring system 110 may, based on monitored information about one or more platforms 140, scale the infrastructure of one or more platforms 140 in order to improve and/or optimize aspects of one or more platforms 140. For instance, in the example of FIG. 1A, central monitoring system 110 determines, based on monitoring of platform 140A and/or based on a detected status change, that an application executing on platform 140A is using significant resources associated with web servers 160 (e.g., storage, CPU utilization, and/or memory). Central monitoring system 110 further determines that the resources being used by web server 160A and web server 160B are at or exceed a threshold. Central monitoring system 110 correlates the monitored metrics and associated data with applications executing within web servers 160. Central monitoring system 110 identifies, based on the correlated metrics, a performance issue associated with an application executing within platform 140A and/or on web servers 160. In response, central monitoring system 110 sends a signal, over network 105, to platform 140A. In response to receiving the signal, platform 140A instantiates or allocates a new web server within platform 140A to handle some of the load handled by web server 160A and web server 160B. As a result, web server 160C, which may be a virtualized computing resource allocated from a computing infrastructure, is thereafter included within platform 140A as shown in FIG. 1B.

As described, by using information derived from monitoring aspects of platform 140A, central monitoring system 110 may, in some examples, redistribute and/or rebalance resources across all of the service layers (load balancing layer 191 through database layer 195) to adjust, improve, and/or optimize the performance of platform 140A. Accordingly, FIG. 1A illustrates a feedback system in which monitoring information collected from platform 140A is analyzed by central monitoring system 110. Central monitoring system 110 uses the collected information and the results of the analysis to adjust, improve, and/or optimize aspects of platform 140A. As a result, the monitoring information thereafter collected from platform 140A may show that platform 140A is operating with improved performance or efficiency.

Although monitoring of aspects of platform 140A and platforms 140 have been described in terms of operations performed by monitoring agent 151, monitoring agents 161, monitoring agents 171, and monitoring agents 181, central monitoring system 110 may, when adjusting, improving, and/or optimizing aspects of platforms 140, use information collected through other sources. For example, central monitoring system 110 may use information derived from monitoring performed by other systems, services, applications, and/or third-party monitoring tools within system 100. For instance, in one example, one or more third party tools may perform some of the functions associated with monitoring platform 140A. Where there are aspects of platform 140A (or platforms 140) that are not monitored by such third-party tools, or where the third-party tools do not monitor aspects of platform 140 (or platforms 140) in an appropriate or efficient way, additional monitoring may be performed by using monitoring agents. Accordingly, in such an example, each of monitoring agent 151, monitoring agents 161, monitoring agents 171, and monitoring agents 181 perform monitoring and other functions that fill gaps left by third party monitoring tools and/or services.

The criticality of one or more nodes or computing devices may be adjusted when a new node or computing device has been added to one or more platforms 140. For instance, in the example of FIG. 1B, one or more monitoring agents included within platform 140A may detect that new web server 160C has been added to platform 140A. In the example of FIG. 1B, monitoring agent 151 executing on load balancer 150 automatically detects that a new web server has been added to platform 140A. However, in other examples, monitoring agent 161A executing on web server 160A, monitoring agent 161B executing on web server 160B, or one or more other monitoring agents may automatically detect that a new web server has been added to platform 140A. Upon detecting that web server 160C has been added to platform 140A, monitoring agent 151 determines information about web server 160C, and outputs a signal over network 105. Central monitoring system 110 detects a signal over network 105 and determines that the signal includes information about web server 160C added to platform 140A. Central monitoring system 110 determines the criticality of web server 160C, based on information about system 100 stored in data store 111. Central monitoring system 110 updates data store 111 with information about the criticality of web server 160C. Central monitoring system 110 further determines any adjustments to the criticality of other devices, components, or applications of one or more platforms 140, and updates data store 111 to reflect such adjustments. For example, in the example of FIG. 1A, since web server 160C has been added to platform 140A, the criticality of web server 160A and web server 160B may be reduced, since web server 160C may perform operations that web server 160A and web server 160B were previously relied upon to perform. In the example of FIG. 1B, therefore, the criticality of web server 160A and web server 160B may be reduced from 50% to 33%, and the criticality of web server 160C may also be 33%.

In the example shown in FIG. 1B, each of web server 160A, web server 160B, and web server 160C are physical host devices, each including one or more monitoring agents executing thereon. In other examples, however, one or more of web server 160A, web server 160B, and web server 160C may be virtual computing devices or "instances" (e.g., virtual machines or containers) that execute in a virtualized environment provided by a physical computing device. In such an example, only one monitoring agent might be executing on the physical computing device, and that monitoring agent may monitor each virtual computing instance executing on the physical computing device. In other examples, a monitoring agent might be deployed for each virtual machine within the physical computing device.

Figure 1C:
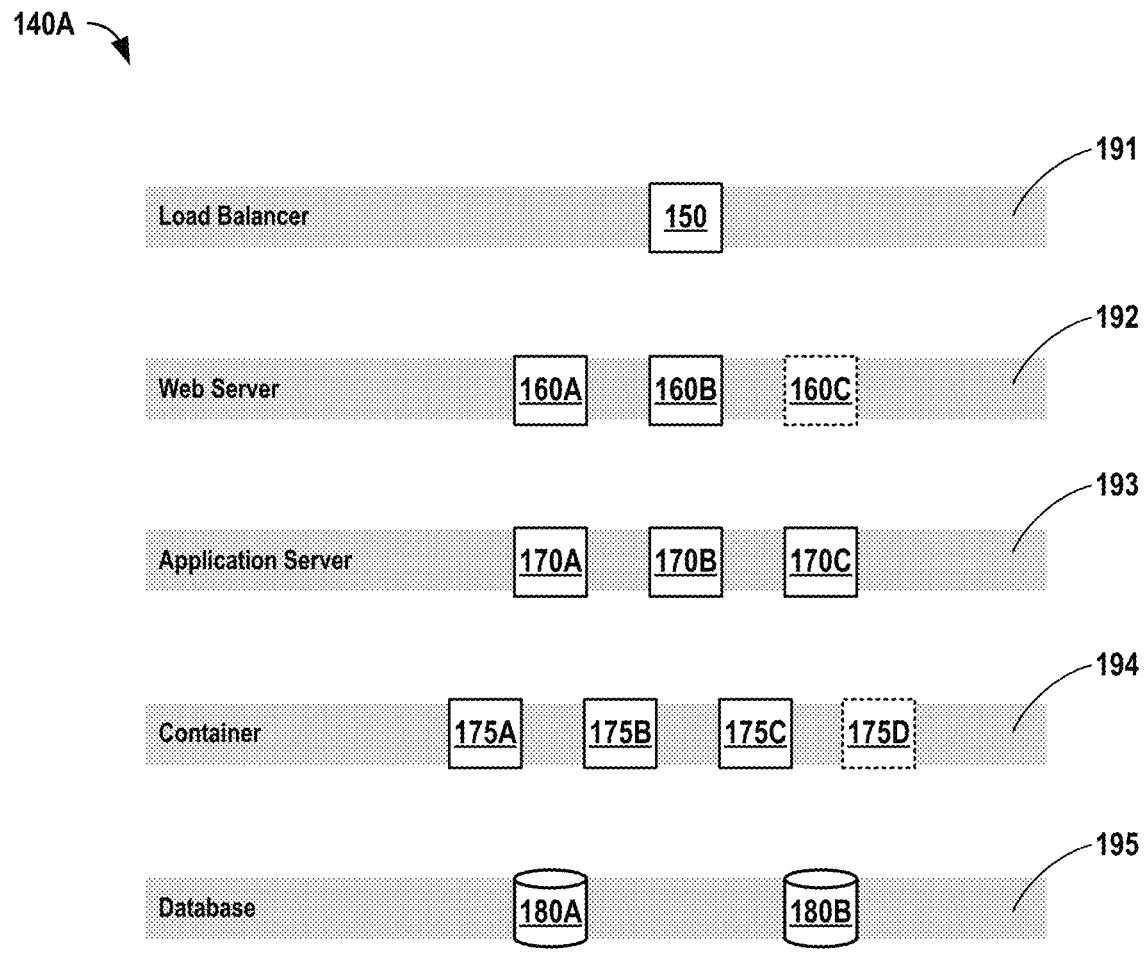
FIG. 1C is a conceptual diagram illustrating service layers associated with a computing infrastructure, in accordance with one or more aspects of the present disclosure

FIG. 1C is a conceptual diagram illustrating service layers associated with a computing infrastructure, in accordance with one or more aspects of the present disclosure. In examples described herein, one or more applications, services, and/or processes may be deployed across multiple service layers ("layers") in a hierarchical network platform, such as the hierarchy or layered network diagram illustrated in FIG. 1C. The service layers illustrated in FIG. 1C may correspond to service layers for platform 140A of FIG. 1A and FIG. 1B. Accordingly, in FIG. 1C, load balancer 150 is represented in load balancing layer 191, web server 160A, web server 160B, and web server 160C are represented in web server layer 192A, application server 170A, application server 170B, and application server 170C are represented in application server layer 193, and database 180A and database 180B are represented in database layer 195. Some of the layers may involve physical network components, devices, or nodes. Other layers may involve at least some virtual components, devices, or nodes. For instance, container layer 194 is a conceptual layer that includes container 175A through container 175D ("containers 175"). In the example of FIG. 1C, each of containers 175 are virtual computing instances that execute on application servers 170. Container layer 194 can be thought of as logically below application server layer 193 within the hierarchy of platform 140A, since in the example of FIG. 1C, containers 175 execute on application servers 170. Applications and/or services within platform 140A execute across the logical layers illustrated in FIG. 1C on the virtual and physical devices illustrated.

Load balancing layer 191, web server layer 192, application server layer 193, 194, and database layer 195 are illustrated in FIG. 1C as an example of a conceptual layering of the components of an application. In other examples, additional or fewer layers may be used. Service layers in a diagram similar to that illustrated in FIG. 1C may include a proxy layer, a context layer, a virtual machine layer, a microservice layer, service layer, service dependency layer, a gateway layer, or other types of layers.

Central monitoring system 110 may vertically scale infrastructure resources within platform 140A. For example, in an example that can be described in the context of FIG. 1A, FIG. 1B, and FIG. 1C, central monitoring system 110 determines, based on monitoring aspects of platform 140A, that significant storage resources are being consumed by one or more applications executing within web servers 160. In some examples, the usage of significant storage resources may be identified as a status change associated with platform 140A. Central monitoring system 110 correlates the monitored metrics and associated data with applications executing within web servers 160. Central monitoring system 110 identifies the consumption of the storage resources as a performance issue associated with an application executing within platform 140A and/or web servers 160. Central monitoring system 110 determines that the performance issue can be addressed by adding one or more additional web servers 160. Central monitoring system 110 causes platform 140A to deploy, instantiate, or spin up web server 160C to handle some of the storage load being borne by web server 160A and web server 160B.

In another example, central monitoring system 110 may determine that resources within 140A are experiencing low utilization levels. In response to that determination, central monitoring system 110 may cause platform 140A to deallocate or remove resources from platform 140A, which may make such resources available for other applications, perhaps executing in another platform. By adding or removing resources from platform 140A based on utilization levels, central monitoring system 110 may vertically and elastically scale resources within platform 140A to allocate an appropriate amount of resources to correspond to the monitored utilization rates within each layer.

Central monitoring system 110 may horizontally scale infrastructure resources within platform 140A. For example, referring again to the example of FIG. 1C, central monitoring system 110 determines, based on monitoring aspects of platform 140A, that containers 175 executing within container layer 194 are experiencing high utilization levels (e.g., high CPU or memory utilization). Central monitoring system 110 correlates the monitored metrics and associated data with applications executing on web servers 160, and identifies an application that is causing or experiencing high utilization levels. Central monitoring system 110 identifies the high utilization levels as a performance issue associated with an application executing within platform 140A. Central monitoring system 110 causes platform 140A to instantiate or spin up container 175D to handle some of the processing for the identified application, and allocates some of the processing performed by container 175A, container 175B, and container 175C to new container 175D. Likewise, if central monitoring system 110 determines that containers 175 within container layer 194 are experiencing low utilization levels, central monitoring system 110 may remove one or more containers 175 from container layer 194. In such an example, resources deallocated within container layer 194 may be available for use by other applications, processes, and services. Accordingly, central monitoring system 110 may also horizontally and elastically scale resources within platform 140A (or any of platforms 140) to allocate an appropriate amount of resources to correspond to the monitored utilization rates within container layer 194.

Central monitoring system 110 may, in some examples, determine whether there is any available capacity within platform 140A or another platform before horizontally or vertically scaling resources. For instance, in the example in which central monitoring system 110 vertically allocates web server 160C for additional storage, central monitoring system 110 may determine whether is any capacity to rebalance or redistribute the storage within platform 140A. If there is such capacity, central monitoring system 110 may alternatively, or in addition, rebalance or redistribute the data or other content stored at web server 160A and web server 160B. Similarly, in the example where central monitoring system 110 causes platform 140A to horizontally scale container layer 194, central monitoring system 110 may consider other options for addressing high utilization levels for containers 175, if such options exist. However, in some cases, there may be a constraint imposed by central monitoring system 110, platform 140A, or otherwise that may foreclose such options, and deploying a new web server or instantiating a new container may be appropriate.

Central monitoring system 110 may adjust, improve, or optimize network traffic loads between layers of platform 140A based on occasional or periodic diagnostic communications between nodes within platform 140A. For instance, with reference to FIG. 1A and FIG. 1C, monitoring agent 161A of web server 160A may cause web server 160A to output a first signal to a parent node, such as load balancer 150. Monitoring agent 151 of load balancer 150 may cause load balancer 150 to respond with a second signal. Monitoring agent 161A may determine, based on when the first signal was sent and the second signal was received, a round-trip time (RTT) between web server 160A in web server layer 192 of FIG. 1C and load balancer 150 in load balancing layer 191 of FIG. 1C. Similarly, monitoring agent 161B of web server 160B may output a signal to load balancer 150, and in response, receive a signal from monitoring agent 151 of load balancer 150. Monitoring agent 161B may determine, based on the timing of the signals between web server 160B and load balancer 150, a round-trip time between web server 160B and load balancer 150. Monitoring agent 161A and monitoring agent 161B may cause web server 160A and web server 160B, respectively, to output information about the round trip times to central monitoring system 110. Central monitoring system 110 may determine, based on the information about the round-trip times, that the connection between load balancer 150 and web server 160A is experiencing a much higher RTT than the connection between load balancer 150 and web server 160B. In some examples, central monitoring system 110 may correlate the RTT values to an application executing within platform 140, and identify the network activity as a performance issue associated with the application. Central monitoring system 110 communicates with platform 140A to cause at least some of the network traffic between load balancer 150 and web server 160A to be allocated to the connection between load balancer 150 and web server 160B. In this way, central monitoring system 110 may adjust, improve, and/or optimize the network and/or platform 140A.

In some examples, determining an RTT between two nodes on a network may be performed by a conventional ping operation. In the examples described in connection with FIG. 1A, FIG. 1B, and FIG. 1C, such a ping operation may be used to determine inter-layer RTT values. Average, maximum, minimum, and other round-trip times can be calculated and/or measured. Such inter-layer RTT values may be useful to determine the source or cause of latency issue between multiple service layers of an application or service, including layers that include virtual devices. Accordingly, a ping operation may be used to determine RTT values associated with network performance within and between service layers of a network, and thereby identify instances of inter-layer network latency.

Although central monitoring system 110 may perform the operations described above automatically (e.g., operations relating to vertical scaling, horizontal scaling, and/or adjusting network traffic loads), in other examples, central monitoring system 110 might perform such tasks in response to approval from a network administrator or other user. For instance, in such an example, central monitoring system 110 may determine one or more actions that may be carried out to address a performance issue associated with one or more of platforms 140. Such actions may include vertical or horizontal infrastructure scaling, rebalancing of network traffic, or another action. Central monitoring system 110 may send a message to mobile device 108, providing information about the action. The information may further include a prompt for authorization to perform the proposed action to address the performance issue. Until authorization is received, central monitoring system 110 might not perform the action. If authorization is received, however, system 100 may perform the proposed action and thereby address the performance issue.

In some examples, central monitoring system 110 may provide information that can be used by a development team (or by other personnel) to efficiently troubleshoot or address various inefficiencies associated with platform 140A or platforms 140. For instance, in one example, central monitoring system 110 monitors, through monitoring agents 181 and/or through other monitoring solutions, the time taken to execute queries on database 180A and database 180B.

Central monitoring system 110 may identify a set of queries that take long than a threshold time to execute. Central monitoring system 110 may correlate the queries with the application issuing such queries, the users associated with such queries, and/or the users affected by the queries. Central monitoring system 110 may identify or pinpoint the specific database query, the source code, and/or the time that the query executed in order to provide information that can be used to troubleshoot the query or the circumstances that cause the latency associated with the query. Central monitoring system 110 may determine that a development team should address the latency associated with the query. Central monitoring system 110 may send information to mobile device 108, to a device monitored by a development team or network administrator, and/or to a dashboard. A development team or network administrator may act on the information to efficiently address or remediate the latency associated with the identified query.

In some examples, the database latency is caused by a query is being used improperly or in an inappropriate context. In such an example, a development team could adjust the application or the database to ensure that such a query is not allowed to execute and/or provide instructions to a user responsible for executing such queries. In other examples, database latency is caused by inefficient software instructions, database instructions, or code.

FIG. 1A and FIG. 1B illustrate at least one example implementation of system 100. FIG. 1C illustrates an example implementation of service layers within platform 140A of FIG. 1A and FIG. 1B. Other example or alternate implementations of system 100 and associated service layers may be appropriate in other instances. Such implementations may include a subset of the devices and/or components included in the example(s) of FIG. 1A, FIG. 1B, and FIG. 1C and/or may include additional devices and/or components not shown in FIG. 1A, FIG. 1B, and FIG. 1C. Accordingly, although one or more implementations of system 100 have been described with reference to FIG. 1A, FIG. 1B, and FIG. 1C, system 100 may be implemented in a number of different ways.

For instance, one or more devices of system 100 that may be illustrated as separate devices may alternatively be implemented as a single device; one or more components of system 100 that may be illustrated as separate components may alternatively be implemented as a single component. Also, in some examples, one or more devices of system 100 that may be illustrated as a single device may alternatively be implemented as multiple devices; one or more components of system 100 that may be illustrated as a single component may alternatively be implemented as multiple components. Each of the multiple devices and/or components may be directly coupled via wired or wireless communication and/or remotely coupled via one or more networks. Also, one or more devices or components that may be illustrated in FIG. 1A, FIG. 1B, and/or FIG. 1C may alternatively be implemented as part of another device or component not shown in FIG. 1A, FIG. 1B, and/or FIG. 1C.

Further, certain operations, techniques, features, and/or functions may have been described herein as being performed by specific components, devices, and/or modules in FIG. 1A, FIG. 1B, and/or FIG. 1C. In other examples, such operations, techniques, features, and/or functions may be performed by different components, devices, or modules. Accordingly, some operations, techniques, features, and/or functions that may have been described herein as being attributed to one or more components, devices, or modules in FIG. 1A, FIG. 1B, and/or FIG. 1C may, in other examples, be attributed to other components, devices, and/or modules, even if not specifically described herein in such a manner.

By monitoring nodes independently in a distributed fashion using agents, system 100 may detect status changes earlier. By detecting status changes earlier, system 100 may more quickly deliver alerts about those status changes, and may do so in a near or seemingly near real-time manner. Therefore, aspects of this disclosure may improve the function of system 100 because monitoring nodes independently in a distributed fashion using agents may have the effect of enabling alerts about status changes to be delivered more quickly.

By monitoring nodes independently in a distributed fashion using agents, each of the agents may operate independently while still be centrally configurable. By operating independently while still being centrally configurable, agents may perform operations in parallel without unduly increasing the complexity of managing the agents. Therefore, aspects of this disclosure may improve the function of system 100 because monitoring nodes independently in a distributed fashion using agents may have the effect of enabling operations to be performed in parallel without undue complexity.

By determining the criticality of each node of a network, a more intelligent assessment of the impact of a status change on the network can be made. If impact assessments resulting from status changes are more intelligent, system 100 may operate in a more reliable and efficient manner, because system 100 is easier to maintain and manage if more intelligent information about impact assessments are available. Therefore, aspects of this disclosure may improve the function of system 100 because determining the criticality of each node of a network may have the effect of causing system 100 to operate more reliably and effectively.

By determining criticality of each node of a network, alerts sent by system 100 can be more effectively prioritized since status changes that are particularly important can be identified more easily. By more effectively prioritizing alerts sent by system 100, system 100 may perform less processing operations sending low priority alerts and thereby consume less electrical power and network bandwidth. Therefore, aspects of this disclosure may improve the function of system 100 because determining the criticality of each node of a network may have the effect of causing system 100 to consume less electrical power and consume less network bandwidth.

By dynamically adjusting the criticality some or all of the nodes in a network as a result of new nodes being added to the network, system 100 may automatically assimilate changes to the network. By automatically assimilating changes to the network, system 100 may operate more autonomously and reliably because less manual intervention may be required if system 100 automatically discovers and adjusts for new nodes being added. Therefore, aspects of this disclosure may improve the function of system 100 because dynamically adjusting the criticality of nodes as a result of a new node being added may have the effect of causing system 100 to operate more autonomously and reliably.

By correlating monitored data (from agents or otherwise) to applications executing within one or more platforms 140, central monitoring system 110 may enable causes of performance issues to be readily identified. By identifying causes of performance issues, central monitoring system 110 may avoid requiring a network administrator to diagnose, identify, and troubleshoot performance issues through interactions with system 100 and/or platforms 140. Such interactions may involve many computing operations and/or cause disruptions to computing operations being performed within system 100. Therefore, aspects of this disclosure may improve the function of system 100 because correlating monitored data in the manner described herein may have the effect of avoiding unnecessary computing operations and/or avoiding disruptions to computing operations being performed by system 100.

By identifying, based on identified performance issues, actions (i.e., remedial actions) to address performance issues for one or more platforms 140, system 100 may, by performing such actions, improve the performance of one or more applications executing on platforms 140. Accordingly, aspects of this disclosure may improve the function of system 100 and/or platforms 140 because identifying remedial actions may have the effect of improving the performance of one or more platforms 140 within system 100.

Figure 2:
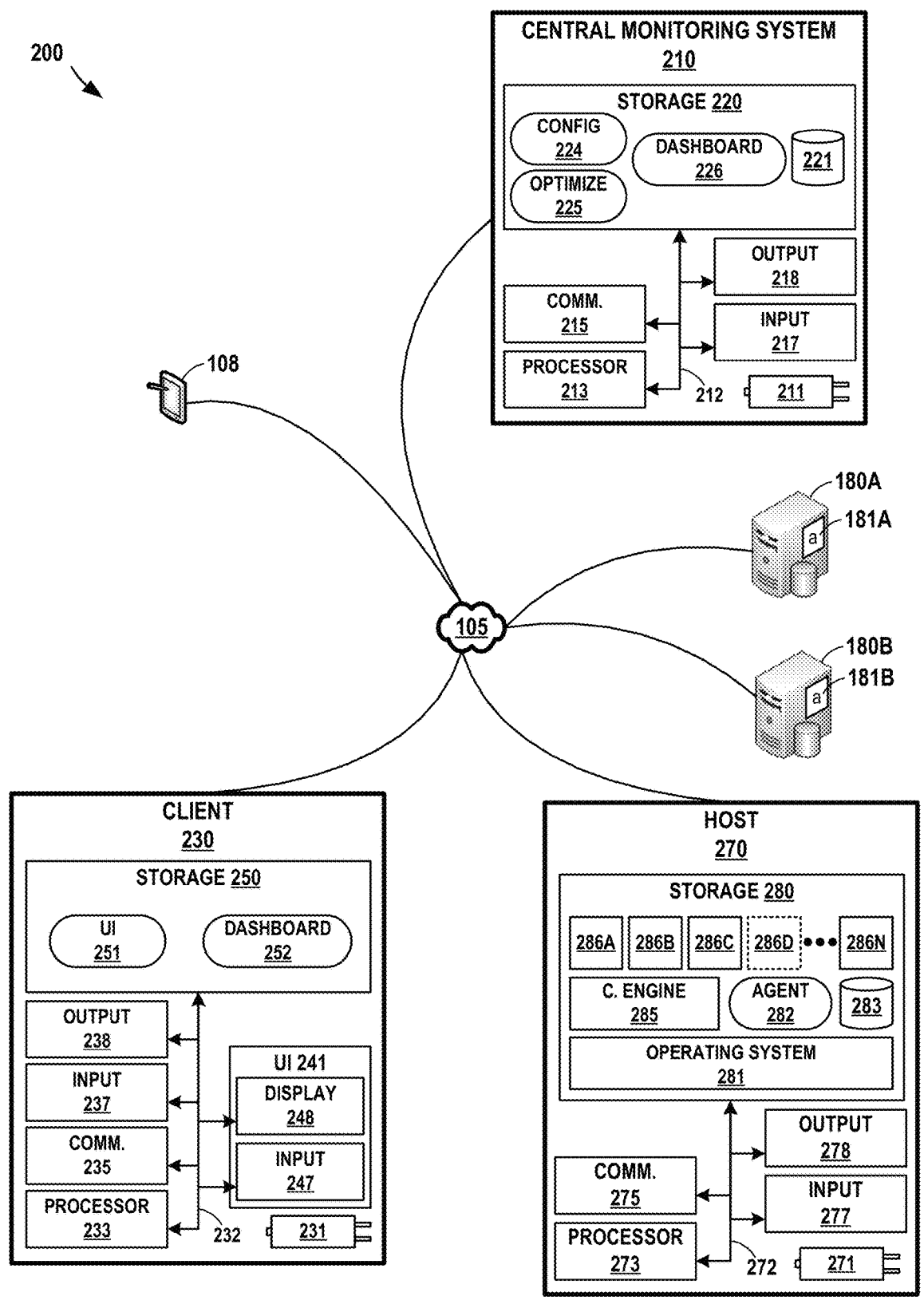
FIG. 2 is a block diagram illustrating an example system for monitoring one or more applications and/or nodes operating in a computing environment, in accordance with one or more aspects of the present disclosure.

FIG. 2 is a block diagram illustrating an example system for monitoring one or more applications and/or nodes operating in a computing environment, in accordance with one or more aspects of the present disclosure. System 200 of FIG. 2 may be described as an example or alternate implementation of system 100 of FIG. 1A and FIG. 1B. One or more aspects of FIG. 2 may be described herein within the context of FIG. 1A and FIG. 1B.

In the example of FIG. 2, system 200 includes network 105, central monitoring system 210, client device 230, host 270, database 180A, database 180B, and mobile device 108. In FIG. 2, mobile device 108 may correspond to mobile device 108 of FIG. 1A and FIG. 1B, network 105 may correspond to network 105 of FIG. 1A and FIG. 1B, and databases 180 (database 180A and database 180B) may correspond to databases 180 of FIG. 1A and FIG. 1B. Also, central monitoring system 210 may correspond to central monitoring system 110 of FIG. 1A and FIG. 1B, client device 230 may correspond to client device 130 of FIG. 1A and FIG. 1B, and host 270 may correspond to one or more of application servers 170 of FIG. 1A and FIG. 1B. Each of these systems may be implemented in a manner consistent with the description provided in connection with FIG. 1A, FIG. 1B, and/or FIG. 1C, although in some examples, such systems may involve alternate implementations with more, fewer, or different capabilities. For ease of illustration, only one central monitoring system 210, one client device 230, and one host 270 is illustrated in FIG. 2, although techniques in accordance with one or more aspects of this disclosure may be performed with many more of such systems.

Network 105 may be the internet, or may include or represent any public or private communications network or other network. For instance, network 105 may be a cellular, Wi-Fi®, ZigBee, Bluetooth, Near-Field Communication (NFC), satellite, enterprise, service provider, and/or other type of network enabling transfer of transmitting data between computing systems, servers, and computing devices. One or more of client devices, server devices, or other devices may transmit and receive data, commands, control signals, and/or other information across network 105 using any suitable communication techniques. Network 105 may include one or more network hubs, network switches, network routers, satellite dishes, or any other network equipment. Such devices or components may be operatively inter-coupled, thereby providing for the exchange of information between computers, devices, or other components (e.g., between one or more client devices or systems and one or more server devices or systems). Each of the devices or systems illustrated in FIG. 2 may be operatively coupled to network 105 using one or more network links. The links coupling such devices or systems to network 105 may be Ethernet, Asynchronous Transfer Mode (ATM) or other types of network connections, and such connections may be wireless and/or wired connections. One or more of the devices or systems illustrated in FIG. 2 or otherwise on network 105 may be in a remote location relative to one or more other illustrated devices or systems.

Central monitoring system 210 may be implemented as any suitable computing system, such as one or more server computers, workstations, mainframes, appliances, cloud computing systems, and/or other computing systems that may be capable of performing operations and/or functions described in accordance with one or more aspects of the present disclosure. In some examples, central monitoring system 210 represents a cloud computing system, server farm, and/or server cluster (or portion thereof) that provides services to client devices and other devices or systems. In other examples, central monitoring system 210 may represent or be implemented through one or more virtualized compute instances (e.g., virtual machines, containers) of a cloud computing system, server farm, data center, and/or server cluster.

In the example of FIG. 2, central monitoring system 210 may include power source 211, one or more communication units 215, one or more input devices 217, one or more output devices 218, and one or more storage devices 220. Storage devices 220 include configuration module 224, dashboard module 226, and data store 221. One or more of the devices, modules, storage areas, or other components of central monitoring system 210 may be interconnected to enable inter-component communications (physically, communicatively, and/or operatively). In some examples, such connectivity may be provided by through communication channels (e.g., communication channels 212), a system bus, a network connection, an inter-process communication data structure, or any other method for communicating data.

Power source 211 may provide power to one or more components of central monitoring system 210. Power source 211 may receive power from the primary alternating current (AC) power supply in a building, home, or other location. In other examples, power source 211 may be a battery or a device that supplies direct current (DC). In still further examples, central monitoring system 210 and/or power source 211 may receive power from another source. One or more of the devices or components illustrated within central monitoring system 210 may be connected to power source 211, and/or may receive power from power source 211. Power source 211 may have intelligent power management or consumption capabilities, and such features may be controlled, accessed, or adjusted by one or more modules of central monitoring system 210 and/or by one or more processors 213 to intelligently consume, allocate, supply, or otherwise manage power.

One or more processors 213 of central monitoring system 210 may implement functionality and/or execute instructions associated with central monitoring system 210 or associated with one or more modules illustrated herein and/or described below. One or more processors 213 may be, may be part of, and/or may include processing circuitry that performs operations in accordance with one or more aspects of the present disclosure. Examples of processors 213 include microprocessors, application processors, display controllers, auxiliary processors, one or more sensor hubs, and any other hardware configured to function as a processor, a processing unit, or a processing device. Central monitoring system 210 may use one or more processors 213 to perform operations in accordance with one or more aspects of the present disclosure using software, hardware, firmware, or a mixture of hardware, software, and firmware residing in and/or executing at central monitoring system 210.

One or more communication units 215 of central monitoring system 210 may communicate with devices external to central monitoring system 210 by transmitting and/or receiving data, and may operate, in some respects, as both an input device and an output device. In some examples, communication unit 215 may communicate with other devices over a network. In other examples, communication units 215 may send and/or receive radio signals on a radio network such as a cellular radio network. In other examples, communication units 215 of central monitoring system 210 may transmit and/or receive satellite signals on a satellite network such as a Global Positioning System (GPS) network. Examples of communication units 215 include a network interface card (e.g. such as an Ethernet card), an optical transceiver, a radio frequency transceiver, a GPS receiver, or any other type of device that can send and/or receive information. Other examples of communication units 215 may include devices capable of communicating over Bluetooth®, GPS, NFC, ZigBee, and cellular networks (e.g., 3G, 4G, 5G), and Wi-Fi® radios found in mobile devices as well as Universal Serial Bus (USB) controllers and the like. Such communications may adhere to, implement, or abide by appropriate protocols, including Transmission Control Protocol/Internet Protocol (TCP/IP), Ethernet, Bluetooth, NFC, or other technologies or protocols.

One or more input devices 217 may represent any input devices of central monitoring system 210 not otherwise separately described herein. Input devices 217 may generate, receive, and/or process input. For example, one or more input devices 217 may generate or receive input from a network, a user input device, or any other type of device for detecting input from a human or machine.

One or more output devices 218 may represent any output devices of central monitoring system 210 not otherwise separately described herein. Output devices 218 may generate, present, and/or process output. For example, one or more output devices 218 may generate, present, and/or process output in any form. Output devices 218 may include one or more USB interfaces, video and/or audio output interfaces, or any other type of device capable of generating tactile, audio, visual, video, electrical, or other output. Some devices may serve as both input and output devices. For example, a communication device may both send and receive data to and from other systems or devices over a network.

One or more storage devices 220 within central monitoring system 210 may store information for processing during operation of central monitoring system 210. Storage devices 220 may store program instructions and/or data associated with one or more of the modules described in accordance with one or more aspects of this disclosure. One or more processors 213 and one or more storage devices 220 may provide an operating environment or platform for such modules, which may be implemented as software, but may in some examples include any combination of hardware, firmware, and software. One or more processors 213 may execute instructions and one or more storage devices 220 may store instructions and/or data of one or more modules. The combination of processors 213 and storage devices 220 may retrieve, store, and/or execute the instructions and/or data of one or more applications, modules, or software. Processors 213 and/or storage devices 220 may also be operably coupled to one or more other software and/or hardware components, including, but not limited to, one or more of the components of central monitoring system 210 and/or one or more devices or systems illustrated as being connected to central monitoring system 210.

In some examples, one or more storage devices 220 are temporary memories, meaning that a primary purpose of the one or more storage devices is not long-term storage. Storage devices 220 of central monitoring system 210 may be configured for short-term storage of information as volatile memory and therefore not retain stored contents if deactivated. Examples of volatile memories include random access memories (RAM), dynamic random access memories (DRAM), static random access memories (SRAM), and other forms of volatile memories known in the art. Storage devices 220, in some examples, also include one or more computer-readable storage media. Storage devices 220 may be configured to store larger amounts of information than volatile memory. Storage devices 220 may further be configured for long-term storage of information as non-volatile memory space and retain information after activate/off cycles. Examples of non-volatile memories include magnetic hard disks, optical discs, floppy disks, Flash memories, or forms of electrically programmable memories (EPROM) or electrically erasable and programmable (EEPROM) memories.

Configuration module 224 may perform functions relating to configuring one or more monitoring agents and/or performing an impact analysis for changes in status to one or more nodes of system 200 or for new nodes added to a network. Configuration module 224 may determine the criticality of one or more nodes in a network. Configuration module 224 may maintain data store 221, and store within data store 221 information about the criticality of nodes within a network and/or a set of rules associated with nodes and/or types of nodes within a network. Configuration module 224 may determine whether any adjustments to the criticality of other nodes should be made, and if so, configuration module 224 may perform such adjustments by, for example, configuring or updating the configuration of agents executing on hosts within a network. Configuration module 224 may interact with and/or operate in conjunction with one or more modules of central monitoring system 210, including dashboard module 226.

Optimization module 225 (illustrated as "optimize 225") may perform functions relating to adjusting, improving, and/or optimizing aspects of system 100 and/or platforms 140. Optimization module 225 may correlate monitoring information to one or more applications executing within platforms 140. Optimization module 225 may identify an application or process associated with high or low utilization levels for infrastructure resources, various metrics associated with network performance, and/or response or run times for database operations. Optimization module 225 may determine one or more actions to perform to address high infrastructure utilization, poor network performance, and/or poor database performance. Optimization module 225 may cause one or more of platforms 140 to horizontally or vertically scale infrastructure resources. Optimization module 225 may cause a message to be sent or a dashboard to be updated that prompts a user to approve of an action that may address a performance issue.

Dashboard module 226 may perform functions relating to responding to request for information intended to be presented as a dashboard on a client device. For example, dashboard module 226 may receive a request to present a hierarchical view of the services associated with one or more services. In another example, dashboard module 226 may receive a request to present information about communications between two applications shown connected by one or more connection display elements or one or more connection display elements. Dashboard module 226 may respond to such requests by outputting information about one or more services, one or more application display elements, and/or one or more connection display elements. Dashboard module 226 may, in responding to such requests, access information stored within 221. Dashboard module 226 may interact with and/or operate in conjunction with one or more modules of central monitoring system 210, including configuration module 224.

Data store 221 may represent any suitable data structure or storage medium for storing information related to storing configuration information, criticality information, and or rules information relating to types of nodes. The information stored in data store 221 may be searchable and/or categorized such that one or more modules within central monitoring system 210 may provide an input requesting information from data store 221, and in response to the input, receive information stored within data store 221. Data store 221 may provide other modules with access to the data stored within data store 221, and/or may analyze the data stored within data store 221 and output such information on behalf of other modules of central monitoring system 210. Data store 221 may be primarily maintained by configuration module 224.

Client device 230 may be implemented as any suitable computing system, such as a mobile, non-mobile, wearable, and/or non-wearable computing device. Client device 230 may represent a smart phone, a tablet computer, a computerized watch, a computerized glove or gloves, a personal digital assistant, a virtual assistant, a gaming system, a media player, an e-book reader, a television or television platform, a bicycle, automobile, or navigation, information and/or entertainment system for a bicycle, automobile or other vehicle, a laptop or notebook computer, a desktop computer, or any other type of wearable, non-wearable, mobile, or non-mobile computing device that may perform operations in accordance with one or more aspects of the present disclosure.

In the example of FIG. 2, client device 230 may include power source 231, one or more processors 233, one or more communication units 235, one or more input devices 237, one or more output devices 238, one or more user interface devices 241, and one or more storage devices 250. User interface device 241 includes input device 247 and display 248. Storage device 250 includes user interface module 251 and dashboard module 252. One or more of the devices, modules, storage areas, or other components of client device 230 may be interconnected to enable inter-component communications (physically, communicatively, and/or operatively). In some examples, such connectivity may be provided by through communication channels (e.g., communication channels 232), a system bus, a network connection, an inter-process communication data structure, or any other method for communicating data.

Power source 231 may provide power to one or more components of client device 230, and may be implemented in a manner similar to or consistent with other sources of power described herein.

One or more processors 233 of client device 230 may implement functionality and/or execute instructions associated with client device 230 or associated with one or more modules illustrated herein and/or described below and may be implemented in a manner similar to or consistent with the description of other processors or processing circuitry described herein.

One or more communication units 235 of client device 230 may communicate with devices external to client device 230 by transmitting and/or receiving data over a network or otherwise, and may be implemented in a manner similar to or consistent with the description of other communication units described herein.

User interface device 241 may function as an input and/or output device or set of input/output devices for client device 230, and may be implemented using various devices, components, and/or technologies. User interface device 241 may include presence-sensitive input panel technologies, microphone technologies, voice activation and/or recognition technologies, cameras, sensor technologies (e.g., infrared, image, location, motion, accelerometer, gyrometer, magnetometer), or other input device technology for use in receiving user input; user interface device 241 may include display devices, speaker technologies, haptic feedback technologies, tactile feedback technologies, light emitting technologies, or other output device technologies for use in outputting information to a user. In the example of FIG. 2, user interface device 241 includes one or more displays 248 and one or more input devices 247.

One or more displays 248 may generally refer to any appropriate type of display device, such as a display associated with any type of computing device, such as a tablet, mobile phone, watch, or any other type of wearable, non-wearable, mobile, or non-mobile computing device. Display 248 may function as one or more output (e.g., display) devices using technologies including liquid crystal displays (LCD), dot matrix displays, light emitting diode (LED) displays, organic light-emitting diode (OLED) displays, e-ink, or similar monochrome or color displays capable of generating tactile, audio, and/or visual output. Display 248 may include a cathode ray tube (CRT) monitor, liquid crystal display (LCD), Light-Emitting Diode (LED) display, or any other type of display device. Display 248 may output information to a user in the form of a user interface, which may be associated with functionality provided by client device 230. Such user interfaces may be associated with computing platforms, operating systems, applications, and/or services executing at or accessible from client device 230 (e.g., network monitoring and/or diagnostic dashboard, and other types of applications). For example, display 248 may present one or more user interfaces which are graphical user interfaces of an application executing at client device 230 including various graphical elements displayed at various locations of display 248.

One or more input devices 247 are components of user interface device 241 and may include a keyboard, pointing device, voice responsive system, video camera, button, sensor, mobile input device, control pad, microphone, presence-sensitive screen, network, or any other type of device for detecting input from a human.

One or more input devices 237 may represent any input devices of client device 230 not otherwise separately described herein, and may include any type of device for detecting input from a machine (e.g., through a USB, Firewire, or other interface). Input devices 237 may generate, receive, and/or process input, and may be implemented in a manner similar to or consistent with the description of other input devices described herein.

One or more output devices 238 may represent any output devices of client device 230 not otherwise separately described herein. Output devices 238 may generate, present, and/or process output. For example, one or more output devices 238 may generate, present, and/or process output in the form of tactile, audio, visual, and/or video output. Output devices 238 may include a sound card, video graphics adapter card, speaker, presence-sensitive screen, one or more USB interfaces, video and/or audio output interfaces, or any other type of device capable of generating tactile, audio, visual, video, or other output (e.g., a haptic response, a sound, a flash of light, and/or images). Some devices may serve as both input and output devices. For example, a communication device may both send and receive data to and from other systems or devices over a network. Also, a touch-sensitive or presence-sensitive display may both detect input in the form of physical taps or gestures, and present output in the form of visual information.

One or more storage devices 250 within client device 230 may store program instructions and/or data associated with one or more of the modules of client device 230 in accordance with one or more aspects of this disclosure. One or more processors 233 and one or more storage devices 250 may provide an operating environment or platform for such modules. Storage devices 250 may be implemented in a manner similar to or consistent with the description of other storage devices described herein.

User interface module 251 may manage user interactions with user interface device 241 and other components of client device 230. User interface module 251 may cause user interface device 241 to output various user interfaces for display or presentation or otherwise, as a user of client device 230 views, hears, or otherwise senses output and/or provides input at user interface device 241. User interface device 241 may detect input, and may output to user interface module 251 one or more indications of input as a user of client device 230 interacts with a user interface presented at user interface device 241. User interface module 251 and user interface device 241 may interpret inputs detected at user interface device 241 and may relay information about the inputs detected at user interface device 241 to one or more associated platforms, operating systems, applications, and/or services executing at client device 230 to cause client device 230 to perform one or more functions. User interface module 251 may receive information and instructions from a platform, operating system, application, and/or service executing at client device 230 and/or one or more remote computing systems. In addition, user interface module 251 may act as an intermediary between a platform, operating system, application, and/or service executing at client device 230 and various output devices of client device 230 (e.g., speakers, LED indicators, audio or electrostatic haptic output devices, light emitting technologies, displays, etc.) to produce output (e.g., a graphic, a flash of light, a sound, a haptic response, etc.).

Dashboard module 252 may perform functions relating to presenting information about nodes and/or applications, services, and/or processes executing within a datacenter, cluster, stack, platform, or network. Dashboard module 252 may receive, over network 105, information that it uses to generate user interface data for presentation by a user interface device. Dashboard module 252 may cause user interface module 251 to present a user interface at user interface device 241 using the user interface data. Dashboard module 252 may receive information about input that it determines corresponds to an interaction, by a user, with a user interface presented by user interface device 241. Dashboard module 252 may, in response, update one or more user interfaces to present further or different information.

Host 270 represents a physical computing device or compute node that provides an execution environment for virtual hosts, virtual machines, containers, and/or other virtualized computing resources. In some examples, host 270 may be a component of a cloud computing system, server farm, and/or server cluster (or portion thereof) that provides services to client devices and other devices or systems. Although primarily described herein as a physical computing device, host 270 may, in other examples, itself be implemented as a virtualized computing device (e.g., as a virtual machine or container).

In the example of FIG. 2, host 270 includes underlying physical compute hardware that includes power source 271, one or more processors 273, one or more communication units 275, one or more input devices 277, one or more output devices 278, and one or more storage devices 280. One or more of the devices, modules, storage areas, or other components of host 270 may be interconnected to enable inter-component communications (physically, communicatively, and/or operatively). In some examples, such connectivity may be provided by through communication channels (e.g., communication channel 272), a system bus, a network connection, an inter-process communication data structure, or any other method for communicating data.

Power source 271 may provide power to one or more components of host 270, and may be implemented in a manner similar to or consistent with other sources of power described herein.

One or more processors 273 of host 270 may implement functionality and/or execute instructions associated with host 270 or associated with one or more modules illustrated herein and/or described below and may be implemented in a manner similar to or consistent with the description of other processors or processing circuitry described herein.

One or more communication units 275 of host 270 may communicate with devices external to host 270 by transmitting and/or receiving data over a network or otherwise, and may be implemented in a manner similar to or consistent with the description of other communication units described herein.

One or more input devices 277 may represent any input devices of host 270 not otherwise separately described herein. Input devices 277 may generate, receive, and/or process input, and may be implemented in a manner similar to or consistent with the description of other input devices described herein.

One or more output devices 278 may represent any output devices of host 270 not otherwise separately described herein. Output devices 278 may generate, present, and/or process output, and may be implemented in a manner similar to or consistent with the description of other output devices described herein.

One or more storage devices 280 within host 270 may store program instructions and/or data associated with one or more of the modules of host 270 in accordance with one or more aspects of this disclosure. One or more processors 273 and one or more storage devices 280 may provide an operating environment or platform for such modules. Storage devices 280 may be implemented in a manner similar to or consistent with the description of other storage devices described herein.

Operating system 281 is a software and/or firmware layer that supports or provides access to a computing device's functions, such as scheduling tasks, execution tasks, and component and/or peripheral control. Operating system 281 may execute within the execution environment provided by storage devices 280 and processors 273. Operating system 281 may provide an operating environment, services, and control for one or more modules executing on host 270.

Container engine 285 may serve as a management and orchestration system for containers 286 that execute within the operating environment provided by operating system 281 and/or the combination of storage devices 280 and processors 273. In some examples, container engine 285 may perform various organizational and maintenance tasks, including organizing one or more containers 286 into logical groups of related containers. Although normally a software module that executes on top of operating systems 281, container engine 285 may, in some examples, be integrated into operating system 281 and may be implemented at least partially through firmware.

One or more containers 286 may represent a stand-alone, executable package of computing instructions. In some examples, each of containers 286 include code, runtime objects, system tools, system libraries, and/or settings needed to properly execute. In other examples, some components (e.g., runtime objects, libraries) may be provided by container engine 285 and/or operating system 281. Further, in some examples, each of containers 286 may be isolated from other containers 286 executing on host 270. Like a virtual machine, each of containers 286 is virtualized and may remain isolated from the host machine and other containers. However, unlike a virtual machine, each container may omit an individual operating system and provide only an application suite and application-specific libraries. Each of containers 286 may be executed by host 270 as an isolated user-space instance and may share an operating system and common libraries with other containers executing on the host machine. As used herein, containers 286 may also be referred to as virtualization engines, virtual private servers, silos, or jails. In some examples, the techniques described herein with respect to containers may be applied to virtual machines or other virtualization components. In some examples, containers are managed by their host kernel to allow limitation and prioritization of resources (CPU, memory, block I/O, network, etc.) without the need for starting any virtual machines, in some cases using namespace isolation functionality that allows complete isolation of an application's (e.g., a given container) view of the operating environment, including process trees, networking, user identifiers and mounted file systems.

Monitoring agent 282 may perform functions relating to monitoring one or more nodes on a network, determining the criticality of a status change to such nodes, and generating alerts in response to such status changes. Monitoring agent 282 may receive, from central monitoring system 210 or elsewhere, configuration information about how to monitor one or more nodes, information about how and when to send alerts about status changes, and/or information about the criticality of one or more nodes included within a network and/or executing on host 270. Monitoring agent 282 may store and maintain information in data store 283. Monitoring agent 282 may detect status changes associated with nodes, including ports, URLs, processes, containers, virtual machines, network components, or other aspects of system 200. Monitoring agent 282 may determine an impact resulting from a status change, including the impact on one or more nodes within system 200, including containers 286, host 270, applications executing on host 270, and/or other devices. Monitoring agent 282 may determine that the severity and/or impact of the status change might require intervention by a network administrator, and may, in some examples, send an alert to a network administrator including information about the status change. Monitoring agent 282 may interact with and/or operate in conjunction with one or more modules of host 270. Although monitoring agent 282 may be described in connection with FIG. 2 as primarily executing as an application or operating system service, monitoring agent 282 may alternatively operate in other ways, such as within the operating system or kernel, within container engine 285, or within a virtual machine executing on host 270.

Data store 283 may represent any suitable data structure or storage medium for storing information related to storing configuration information, criticality information, and or rules information relating to types of nodes. The information stored within data store 283 may be sufficient, in some or all cases, to determine the criticality of a status change taking place at host 270. The information stored in data store 283 may be searchable and/or categorized such that one or more modules within host 270 may provide an input requesting information from data store 283, and in response to the input, receive information stored within data store 283. Data store 283 may provide other modules with access to the data stored within data store 283, and/or may analyze the data stored within data store 283 and output such information on behalf of other modules of host 270. Data store 283 may be primarily maintained by monitoring agent 282.

In the example of FIG. 2, and in accordance with one or more aspects of the present disclosure, host 270 may be remotely configured by central monitoring system 210. For instance, in the example of FIG. 2, configuration module 224 of central monitoring system 210 causes communication unit 215 to output a signal over network 105. Communication unit 275 of host 270 detects a signal over network 105 and outputs to monitoring agent 282 information about the signal. Monitoring agent 282 determines that the signal corresponds to configuration information about how to monitor host 270 and nodes included within host 270. Monitoring agent 282 may further determine that the signal includes information about how and when to send alerts about nodes included within of host 270. Monitoring agent 282 may also determine that the signal includes information about the criticality of one or more nodes within host 270 (e.g., criticality of one or more containers 286 executing in the environment provided by container engine 285). Monitoring agent 282 may determine that the signal includes rules associated with each process, application, container, virtual machine, node, or other aspect of host 270. Monitoring agent 282 may use such rules to determine the criticality of one or more containers 286 or any future containers 286 that may be instantiated or created. Monitoring agent 282 may store some or all of the configuration information in data store 283.

Monitoring agent 282 executing on host 270 may monitor aspects of host 270. For instance, in the example of FIG. 2, monitoring agent 282 monitors one or more of the nodes within host 270 (e.g., ports, URLs, processes, containers, virtual machines, network activity, and other aspects of host 270). Monitoring agent 282 may detect status changes associated with ports, URLs, processes, containers, virtual machines, network connectivity, or other aspects of host 270. Monitoring agent 282 may log status changes, error conditions, and/or other information collected or determined while monitoring aspects of host 270. Monitoring agent 282 may store, in data store 283, information derived from monitoring operations of host 270.

Monitoring agent 282 may determine the impact of a status change detected at host 270. For instance, in the example of FIG. 2, monitoring agent 282 determines that container 286C has stopped operating correctly, is no longer operable, and/or has undergone some other status change. Monitoring agent 282 accesses information stored in data store 283 and performs an impact analysis of the status change associated with container 286C. Monitoring agent 282 determines the impact of the status change, including the impact on container 286C itself, on host 270, on applications executing on host 270 and/or other devices, and on other nodes in the network hierarchy or within any platform associated with host 270.

Monitoring agent 282 may, in some examples, send an alert in response to detecting a status change. Monitoring agent 282 may, based on the impact analysis performed, determine that an alert should be sent to one or more devices monitored by network administrators. In some examples, monitoring agent 282 makes such a determination if the severity and/or impact of the status change might require intervention or remediation by central monitoring system 210, host 270, and/or by a network administrator. In such an example, monitoring agent 282 causes communication unit 275 to output a signal over network 105. Mobile device 108 detects a signal over network 105 and determines that the signal includes information sufficient to generate user interface data for presentation by a user interface device. Mobile device 108 generates the user interface data and presents a corresponding user interface at a display device associated with mobile device 108.

In some examples, the alert sent by monitoring agent 282 may report on a remedial action taken by monitoring agent 282, by central monitoring system 210, or by another system to address the status change. In other examples, the alert sent by monitoring agent 282 may prompt a user or administrator for authorization to perform a proposed action. In still other examples, the alert sent by monitoring agent 282 may provide diagnostic and/or troubleshooting information that enables a developer or administrator to efficiently address any inefficiency indicated by the status change.

In other examples, monitoring agent 282 might not send an alert in response to detecting a status change. Monitoring agent 282 may, based on the impact analysis, determine that an alert need not be sent to one or more devices monitored by network administrators. In some examples, monitoring agent 282 makes such a determination if the severity and/or impact of the status change does not require immediate intervention by a network administrator.

In some examples, central monitoring system 210 may, in response to the status change, scale infrastructure resources within system 200. For instance, in the example of FIG. 2, monitoring agent 282 executing on host 270 causes communication unit 275 to output a signal over network 105. Communication unit 215 of central monitoring system 210 detects a signal over network 105 and outputs to optimization module 225 an indication of a signal. Optimization module 225 determines that the signal includes information about monitored metrics, from monitoring agent 282 of host 270, associated with one or more nodes or other aspects of host 270 (or platform 140A). In some examples, optimization module 225 may alternatively, or in addition, receive information that optimization module 225 determines corresponds to information about monitored metrics from other sources, including monitoring tools executing and/or agents executing on other devices, or third-party monitoring tools. Optimization module 225 further determines, based on the indication of the signal, that the metrics monitored at host 270 include information about high utilization levels for aspects of host 270. Optimization module 225 correlates the monitored metrics to one or more applications executing on host 270 (or hosts 270, since host 270 may represent multiple host devices in FIG. 2). Optimization module 225 identifies an application or process associated with the high utilization levels. Optimization module 225 determines that an appropriate action to address the high utilization levels includes instantiating or spinning up an additional container on host 270. Optimization module 225 causes communication unit 215 to output a signal over network 105. Communication unit 275 of host 270 detects a signal over network 105. Container engine 285 receives an indication of a signal, and determines that the signal includes instructions to instantiate a new container. Container engine 285 instantiates container 286D, which takes over some of the processing previously performed by other containers 286, and thereby reduces utilization levels associated with the identified application or process.

In the example described, central monitoring system 210 receives metrics and other information from monitoring agent 282 of host 270, analyzes the information, identifies an action to address a performance issue, and causes host 270 to perform the action. In other examples, monitoring agent 282 of host 270 may be configured to perform some or all of the tasks described as being performed by central monitoring system 210. For instance, monitoring agent 282 may, based on information collected by monitoring agent 282 and/or received from other sources, determine one or more actions to address a performance issue or other deficiency of the operation of host 270. Monitoring agent 282 may also perform the action, and thereby adjust, improve, and/or optimize the operation of host 270.

Monitoring agent 282 may detect and/or identify a new node. For instance, in the example of FIG. 2, monitoring agent 282 detects that new container 286D has been instantiated or spun up on host 270. Monitoring agent 282 causes communication unit 275 to output a signal over network 105. Communication unit 215 of central monitoring system 210 detects a signal over network 105. Communication unit 215 outputs information about the signal to configuration module 224. Configuration module 224 determines that the signal includes information about container 286D now executing on host 270. Configuration module 224 analyzes a set of default or customized rules or templates for rules to classify container 286D. In some examples, a set of rules are predefined for one or more nodes (e.g., Tomcat, Apache web server), so that configuration module 224 is able to determine if the new node (e.g., container 286D) can be classified according to one or more of the predefine nodes rule sets.

When adding a new node, monitoring agent 282 may apply one or more templates, such as a set of default Discovery Templates (Tomcat Template, HTTPD Template, FIG. 5 Template etc.), which include of predefined rules that monitoring agent 282 uses to classify the newly discovered service/node. In some examples, the newly discovered service/node might need to satisfy the set of rules included in one or more Discovery Templates to be classified according to that template. Existing templates can be customized, and new custom Discovery Templates can be created and/or added the system as per user requirements. Such templates may be stored in data store 283, or in some examples, data store 221.

In some examples, the node/service discovered will be acknowledged as per the set of rules defined in Discovery Template. For example, if monitoring agent 282 determines that a new node/service satisfies all the rules for a Tomcat in Discovery Template, then it will be acknowledged as a Tomcat node/service and the further step of placing that node/service in Hierarchy Diagram will begin. In some examples, the discovered node/service has to satisfy all of the rules mentioned in any of the templates of Discovery Template bucket to be added in the Hierarchy diagram.

Monitoring agent 282 may apply one or more default Mapping Templates (HTTPD-Tomcat Template, FIG. 5-HTTPD Template, HTTPD-JBoss template etc.) which include rules for how to place the discovered node/service in a Hierarchy diagram. A Mapping Template can also be customized as per user requirements. A newly discovered service/node will run through the set of rules of Mapping Template and, if appropriate, it will be placed in Hierarchy Diagram. For example, if the node/service discovered is Tomcat and the Mapping is HTTPD—Tomcat then for instance, if the Load Balancing technology used between Tomcat and Apache HTTPD is Mod Cluster then as per the rule mentioned in Mapping Template the agent 282 will go through Server.xml of Tomcat and look for Mod Cluster listener entry and from that entry will get the host name and/or IP address of the parent apache HTTPD node. Agent 282 may then appropriately map the new service/node in a Hierarchy diagram.

As per the node/service discovered by Discovery Template along with the mapping of the node/service by agents as per Mapping Template the criticality of that particular node/service is also configured and assigned to it, so that as per the criticality the new node/service can be handled in case of any outage. For example, in the default rules of some Mapping Templates, any service/node of a Database might be assigned a value of "1" and the criticality of any Tomcat node/service might then be 1 divided by "n," where n is the number of Tomcat services in that layer. When a new Tomcat service is added, the criticality of that new service will be 1/(n+1) where n>=1 (n is the number of Tomcat services in that layer). The criticality data is collected and used not only for deciding the significance of that particular node/service but also for feeding that data in the Intelligent Impact Analyzer algorithm of agent 282 and/or system 210.

Similarly, when any new application is to be added to the existing system, agents 282 may perform auto-discovery and place the new application within a Hierarchy diagram. For instance, when a new application is to be added agents 282 may, in some examples, be manually run through some or all of the devices, hosts, or machines within system 200. Agents 282 may assist in selecting the machines associated with new applications by displaying all machines on a user-configurable user interface. The user may, in some examples, select machines from UI which are associated with that application.

Once the machines have been grouped in their categories, monitoring agent 282 may apply one or more templates, such as a set of default Discovery Templates (Tomcat Template, HTTPD Template, FIG. 5 Template etc.), which include of predefined rules that monitoring agent 282 uses to classify the newly discovered service/node. In some examples, the newly discovered service/node might need to satisfy the set of rules included in one or more Discovery Templates to be classified according to that template. Existing templates can be customized, and new custom Discovery Templates can be created and/or added the system as per user requirements. Such templates may be stored in data store 283, or in some examples, data store 221.

In some examples, the node/service discovered will be acknowledged as per the set of rules defined in Discovery Template. For example, if monitoring agent 282 determines that a new node/service satisfies all the rules for a Tomcat in Discovery Template, then it will be acknowledged as a Tomcat node/service and the further step of placing that node/service in Hierarchy Diagram will begin. In some examples, the discovered node/service has to satisfy all of the rules mentioned in any of the templates of Discovery Template bucket to be added in the Hierarchy diagram.

Configuration module 224 may determine the criticality of container 286D and update the criticality of related nodes. For instance, in the example of FIG. 2, configuration module 224 determines a place for container 286D in a hierarchy, and determines the criticality of container 286D. Configuration module 224 determines whether any adjustments to the criticality of other nodes should be made, and if so, performs such adjustments. Configuration module 224 updates data store 221 to take account any changes caused by the addition of container 286D at host 270.

Configuration module 224 may update the configuration of monitoring agent 282. For instance, in the example of FIG. 2, configuration module 224 causes communication unit 215 to output a signal over network 105. Communication unit 275 of host 270 detects a signal and outputs to monitoring agent 282 information about the signal. Monitoring agent 282 determines that the signal includes updated information about the criticality of one or more nodes, applications, processes, ports, URLs, or other nodes being monitored by monitoring agent 282. Monitoring agent 282 updates data store 283 with some or all of the information received from central monitoring system 210. Configuration module 224 may, in a similar manner, update the configuration of additional monitoring agents executing on other hosts within the network.

In examples described in connection with FIG. 2, monitoring agent 282 is described as determining the criticality of a status change associated with host 270 or nodes or components of host 270. In other examples, monitoring agent 282 may determine the criticality of such a status change by communicating with central monitoring system 210. Similarly, in the examples described in connection with FIG. 2, central monitoring system 210 is described as adjusting the criticality of aspects of nodes or components of host 270 when container 286D is instantiated or spun up on host 270, based on information received from monitoring agent 282 of host 270. In other examples, monitoring agent 282 may determine adjustments to the criticality of aspects of nodes or components of host 270 when container 286D is spun up on host 270.

In another example, central monitoring system 210 may identify aspects of the operation of databases 180 for adjustment, improvement, or optimization. For instance, still referring to FIG. 2, optimization module 225 monitors database query execution statistics associated with databases 180. Optimization module 225 may obtain such query execution statistics based on information collected by one or more of monitoring agents 171, one or more of monitoring agents 181, or other sources of information about databases 180. Optimization module 225 identifies one or more queries or other database operations that are executing slowly, or where the database is taking more than a threshold amount of time to execute or respond. Optimization module 225 correlates the identified queries with one or more applications executing on host 270. Optimization module 225 identifies one or more applications that are being impacted by the identified queries. Optimization module 225 may identify further information associated with the queries, the identified applications, and/or the databases. Optimization module 225 causes communication unit 215 to output a signal over network 105. Communication unit 235 of client device 230 detects a signal over network 105, and outputs an indication of the signal to dashboard module 252. Dashboard module 252 determines that the signal includes information about the performance of queries executed by one or more of databases 180. Dashboard module 252 generates, based on the information, data underlying a user interface. Dashboard module 252 uses the data to present a user interface at display 248. In some examples, the information presented by display 248 may be used to troubleshoot, adjust, and/or optimize operation of databases 180.

Modules illustrated in FIG. 2 (configuration module 224, optimization module 225, dashboard module 226, user interface module 251, dashboard module 252, and monitoring agent 282) and/or illustrated or described elsewhere in this disclosure may perform operations described using software, hardware, firmware, or a mixture of hardware, software, and firmware residing in and/or executing at one or more computing devices. For example, a computing device may execute one or more of such modules with multiple processors or multiple devices. A computing device may execute one or more of such modules as a virtual machine executing on underlying hardware. One or more of such modules may execute as one or more services of an operating system or computing platform. One or more of such modules may execute as one or more executable programs at an application layer of a computing platform. In other examples, functionality provided by a module could be implemented by a dedicated hardware device.

Although certain modules, data stores, components, programs, executables, data items, functional units, and/or other items included within one or more storage devices may be illustrated separately, one or more of such items could be combined and operate as a single module, component, program, executable, data item, or functional unit. For example, one or more modules or data stores may be combined or partially combined so that they operate or provide functionality as a single module. Further, one or more modules may interact with and/or operate in conjunction with one another so that, for example, one module acts as a service or an extension of another module. Also, each module, data store, component, program, executable, data item, functional unit, or other item illustrated within a storage device may include multiple components, sub-components, modules, sub-modules, data stores, and/or other components or modules or data stores not illustrated.

Further, each module, data store, component, program, executable, data item, functional unit, or other item illustrated within a storage device may be implemented in various ways. For example, each module, data store, component, program, executable, data item, functional unit, or other item illustrated within a storage device may be implemented as a downloadable or pre-installed application or "app." In other examples, each module, data store, component, program, executable, data item, functional unit, or other item illustrated within a storage device may be implemented as part of an operating system executed on a computing device.

FIG. 2 illustrates one example implementation of system 200. Other example or alternate implementations of system 200 may be appropriate in other instances. Such implementations may include a subset of the devices and/or components included in the example of FIG. 2 and/or may include additional devices and/or components not shown in FIG. 2. Accordingly, although one or more implementations of system 200 have been described with reference to FIG. 2, system 200 may be implemented in a number of different ways.

For instance, one or more devices of system 200 that are illustrated as separate devices may be implemented as a single device; one or more components of system 200 that are illustrated as separate components may be implemented as a single component. Also, in some examples, one or more devices of system 200 that are illustrated as a single device may be implemented as multiple devices; one or more components of system 200 that are illustrated as a single component may be implemented as multiple components. Each of the multiple devices and/or components may be directly coupled via wired or wireless communication and/or remotely coupled via one or more networks. Also, one or more devices or components illustrated in FIG. 2 may also be implemented as part of another device or component not shown in FIG. 2. In this and other ways, some of the functions described herein may be performed via distributed processing by two or more devices.

Further, certain operations, techniques, features, and/or functions have been described herein as being performed by specific components, devices, and/or modules in FIG. 2. In other examples, such operations, techniques, features, and/or functions may be performed by different components, devices, or modules. Accordingly, some operations, techniques, features, and/or functions described herein as being attributed to one or more components, devices, or modules in FIG. 2 may, in other examples, be attributed to other components, devices, and/or modules, even if not specifically described herein in such a manner.

Figure 3:
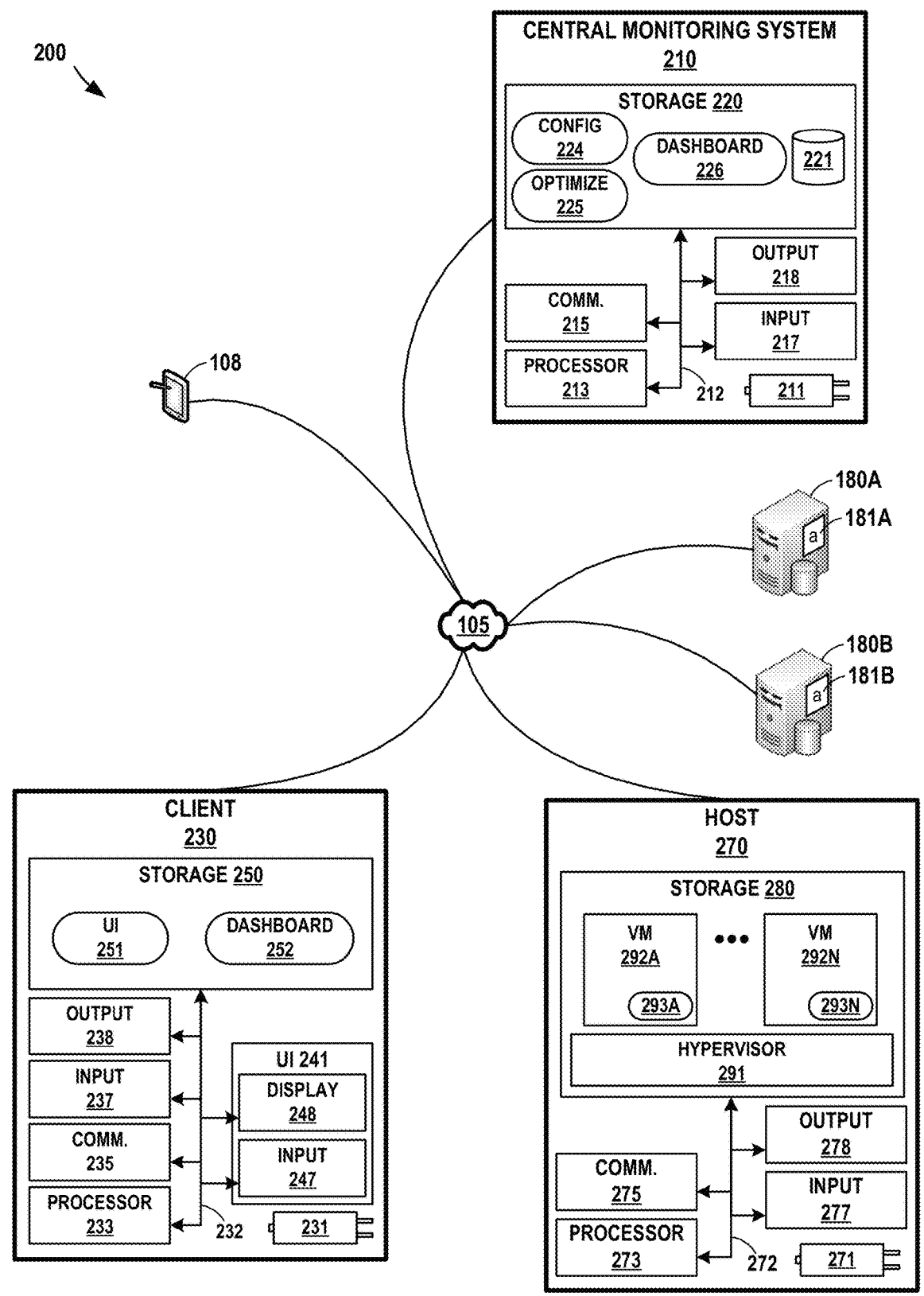
FIG. 3 is a block diagram illustrating another example system for monitoring one or more applications and/or nodes operating in a computing environment, in accordance with one or more aspects of the present disclosure.

FIG. 3 is a block diagram illustrating another example system for monitoring one or more applications and/or nodes operating in a computing environment, in accordance with one or more aspects of the present disclosure. FIG. 3 is similar to FIG. 2, but in FIG. 3, host 270 is configured to execute virtual machines, rather than containers 286 as illustrated in FIG. 2. In the example of FIG. 3, host 270 includes hypervisor 291 and a plurality of virtual machines, including virtual machine 292A through virtual machine 292N ("virtual machines 292"). Further, in the example of FIG. 3, one or more monitoring agents 293 executes within each of virtual machines 292. For example, monitoring agent 293A executes within virtual machine 292A and monitors nodes within or executing within virtual machine 292A. And in general, for an arbitrary number of virtual machines including virtual machine 292N, monitoring agent 293N executes within virtual machine 292N and monitors nodes within or executing within virtual machine 292N.

In some examples, hypervisor 291 is an operating system-level component that executes on a hardware platform (e.g., host 270) to provide a virtualized operating environment and orchestration controller for virtual machines, and/or other types of virtual computing instances. Hypervisor 291 may instantiate, create, and/or execute virtual machines on an underlying host hardware device. In some examples, hypervisor 291 may incorporate the functionality of kernel (e.g., as a "type 1 hypervisor"). In other examples, hypervisor 210 may execute on a kernel (e.g., as a "type 2 hypervisor"). Accordingly, hypervisor 291 may execute within the execution environment provided by storage devices 280 and processors 273 and/or within an operating system kernel. In some situations, hypervisor 210 may be referred to as a virtual machine manager (VMM).

In the example of FIG. 3, and in accordance with one or more aspects of the present disclosure, monitoring agent 293A may monitor nodes within virtual machine 292A. For instance, in the example of FIG. 3, monitoring agent 293A monitors one or more applications executing within virtual machine 292A. Monitoring agent 293A detects status changes associated with such applications, such as, for example, an application not operating properly. Monitoring agent 293A logs status changes, error conditions, and/or other information collected or determined while monitoring applications executing within virtual machine 292A.

Monitoring agent 293A may determine the impact of a status change detected within virtual machine 292A and send an alert. For instance, in the example of FIG. 3, monitoring agent 293A determines that an application executing within virtual machine 292A is not operating properly. Monitoring agent 293A performs an impact analysis of the status change.

Monitoring agent 293A may, based on the impact analysis, determine that an alert should be sent to one or more devices monitored by network administrators. Monitoring agent 293A causes communication unit 275 to output a signal over network 105. Mobile device 108 detects a signal over network 105 and determines that the signal includes information sufficient to generate user interface data for presentation by a user interface device. Mobile device 108 generates the user interface data and presents a corresponding user interface at a display device associated with mobile device 108.

In FIG. 3, and in a manner similar to that described in connection with FIG. 2, central monitoring system 210 may, in response to the status change, scale infrastructure resources within system 200. For instance, in the example of FIG. 3, optimization module 225 determines, based on monitoring information collected by monitoring agent 282 or otherwise, that aspects of host 270 are experiencing high utilization. Optimization module 225 correlates the monitoring information to one or more applications executing on host 270. Optimization module 225 identifies an application or process associated with the high utilization levels. Optimization module 225 determines that an appropriate action to address the high utilization levels includes instantiating an additional virtual machine. Optimization module 225 causes communication unit 215 to output a signal over network 105. Communication unit 275 of host 270 detects a signal over network 105. Hypervisor 291 receives an indication of a signal, and determines that the signal includes instructions to instantiate a new virtual machine, thereby adding to the virtual machines 292 previously executing on host 270. Hypervisor 291 creates a new virtual machine, which takes over some of the processing previously performed by other virtual machines 292 executing on host 270, and thereby reduces utilization levels associated with the identified application or process.

FIG. 4A through FIG. 4J are conceptual diagrams illustrating example user interfaces presented by an example client device in accordance with one or more aspects of the present disclosure. User interfaces illustrated in FIG. 4A through FIG. 4J may correspond to a user interface presented by client device 230 of FIG. 2 and FIG. 3. One or more aspects of the user interfaces illustrated in FIG. 4A and FIG. 4B may be described herein within the context of system 100 of FIG. 1A or FIG. 1B or system 200 of FIG. 2. Although the user interfaces illustrated in FIG. 4A through FIG. 4J are shown as graphical user interfaces, other types of interfaces may be presented by client device 230, including a text-based user interface, a console or command-based user interface, a voice prompt user interface, or any other appropriate user interface now known or hereinafter developed.

Figure 4A:
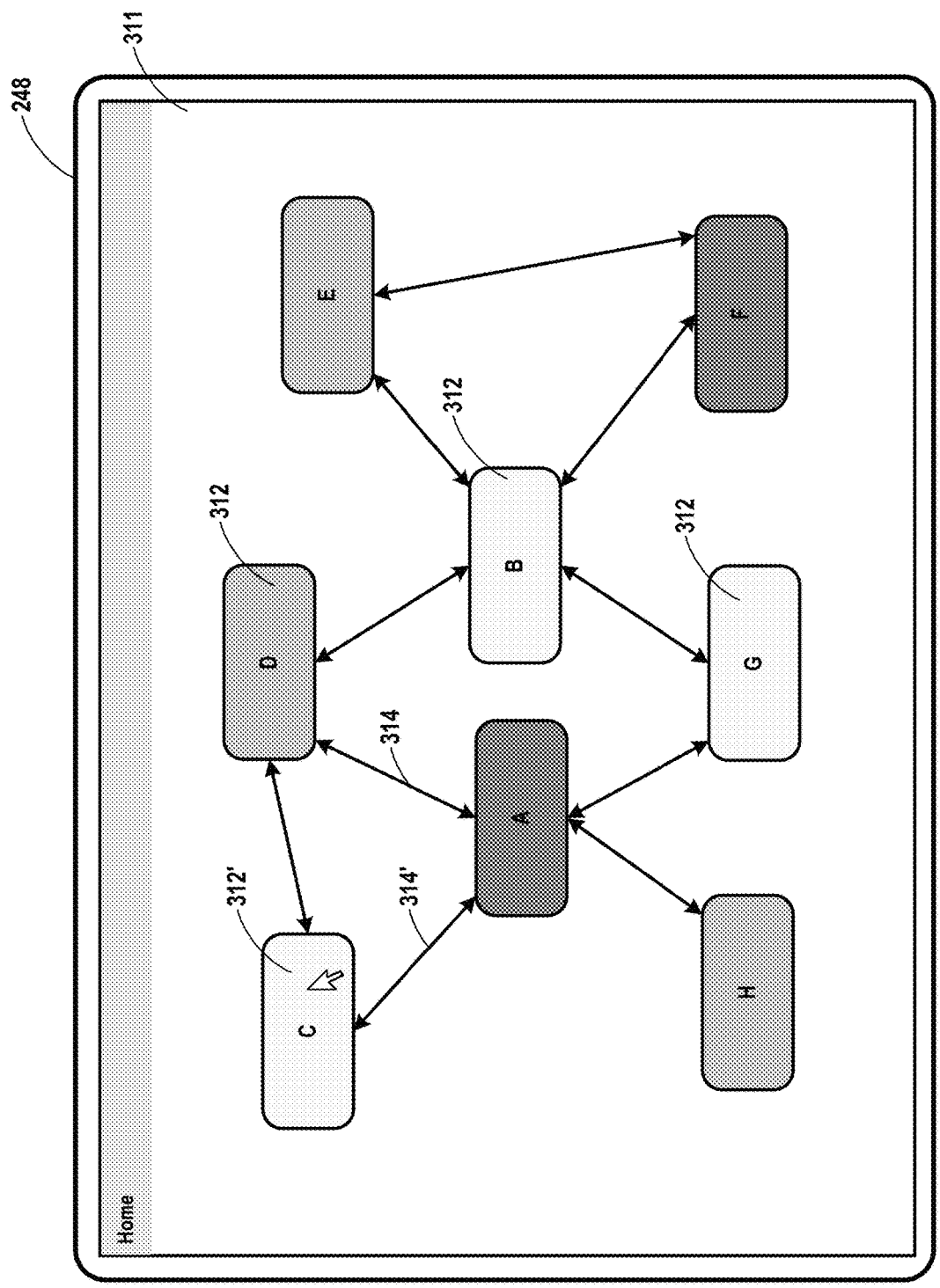
FIG. 4A through FIG. 4J are conceptual diagrams illustrating example user interfaces presented by an example client device in accordance with one or more aspects of the present disclosure.

FIG. 4A is an example user interface illustrating interactions between various applications in an enterprise network, in accordance with one or more aspects of the present disclosure. User interface 311 of FIG. 4A may be presented at a display device associated with client device 230 of FIG. 2. For instance, with reference to FIG. 2, input device 247 detects input and outputs to user interface module 251 an indication of input. User interface module 251 outputs information about the input to dashboard module 252. Dashboard module 252 determines that the input corresponds to a request to present information about nodes and/or applications executing within a datacenter, cluster, or other network. Dashboard module 252 causes communication unit 235 to output a signal over network 105. Communication unit 215 of central monitoring system 210 detects a signal and outputs to dashboard module 226 information about the signal. Dashboard module 226 determines that the signal corresponds to a request to present a dashboard view of applications executing within the network associated with host 270. Dashboard module 226 causes communication unit 215 to output a signal over network 105. Communication unit 235 of client device 230 detects a signal and outputs to dashboard module 252 information about the signal. Dashboard module 252 determines that the signal includes information sufficient to generate user interface data for presentation by a user interface device. Dashboard module 252 generates the user interface data and causes user interface module 251 to present user interface 311 at display 248, as illustrated in FIG. 4A.

In FIG. 4A, user interface 311 includes various application display elements 312, each representing an application or set of applications executing on an enterprise network. Status indicators associated with each application may be provided by an icon, color, colored outline, or other suitable indicator. For example, applications that are fully available may be colored, highlighted, or outlined with green. Those that are partially available may be outlined with yellow. Those that are unavailable or inoperable may be outlined with red. Further, those applications that are in standby mode, in maintenance mode, or those applications not yet brought online might be represented, colored, highlighted, or illustrated with one or more other colors. Connection display elements 314 represent communications between various applications, and may also be illustrated with colors indicating the status of the underlying connection.

Figure 4B:
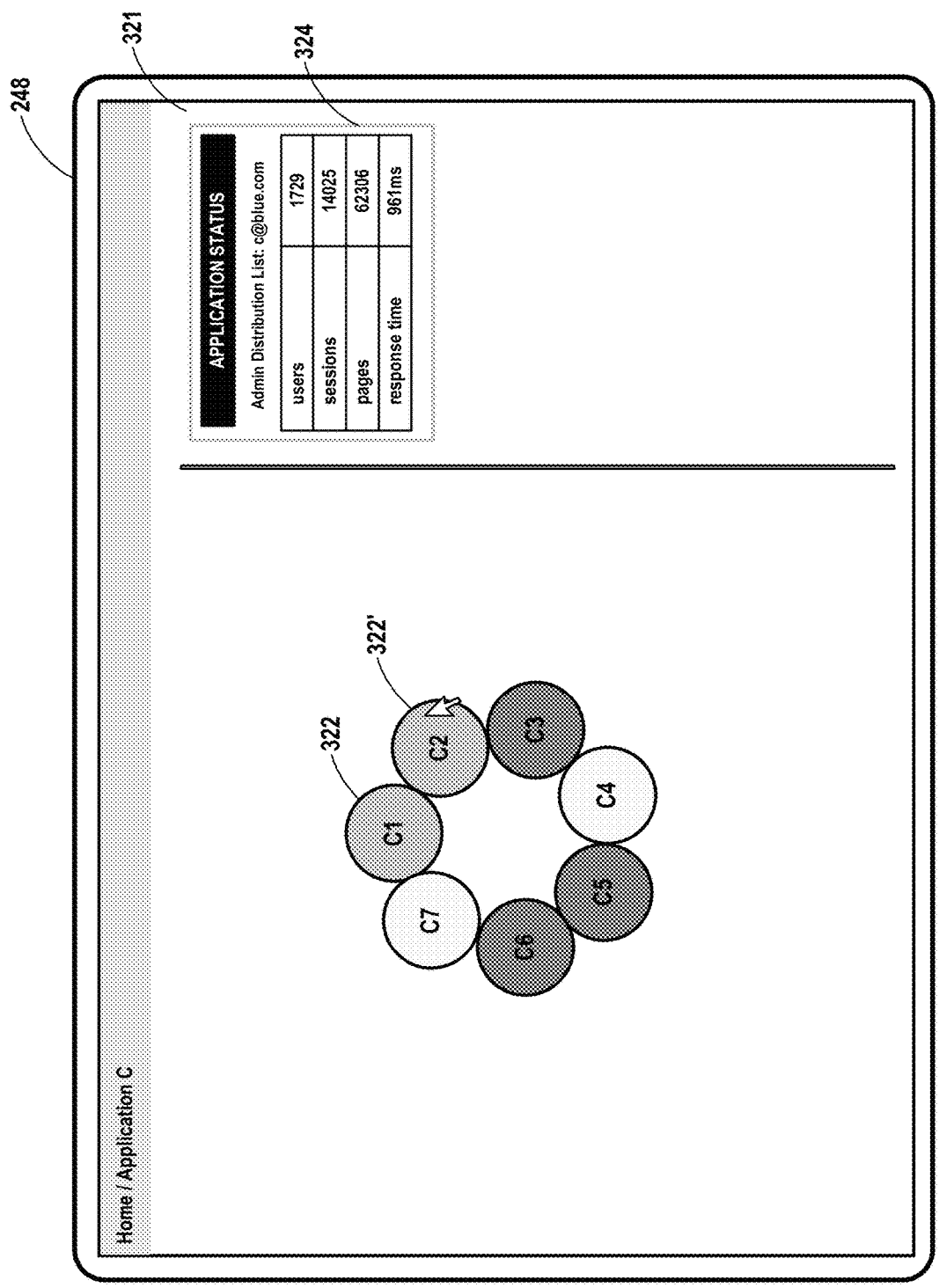

FIG. 4B is an example user interface illustrating services provided by an application represented in FIG. 4A, in accordance with one or more aspects of the present disclosure. User interface 321 of FIG. 4B may be presented at a display device associated with client device 230 of FIG. 2. For instance, referring again to FIG. 2 and FIG. 4A, input device 247 detects input that dashboard module 252 determines corresponds to selection of application display element 312' within user interface 311. Dashboard module 252 causes communication unit 235 to output a signal over network 105. Communication unit 215 of central monitoring system 210 detects a signal that dashboard module 226 determines corresponds to a request to present further information about the application represented by application display element 312'. Dashboard module 226 causes communication unit 215 to output a signal over network 105. Communication unit 235 of client device 230 detects a signal that dashboard module 252 determines includes information sufficient to generate user interface data for presentation by a user interface device. Dashboard module 252 generates the user interface data and causes user interface module 251 to present user interface 321 at display 248, as illustrated in FIG. 4B.

In FIG. 4B, user interface 321 illustrates various services 322 associated with the application represented by application display element 312'. Each of services 322 may include one or more status indicators, which may include an icon, color, or other suitable indicator. For example, services that are fully available may be colored, highlighted or outlined with green, those that are partially available may be outlined with yellow, those that are unavailable or inoperable may be outlined with red. Services that are in standby mode, in maintenance mode, or not yet brought online might be represented, colored, highlighted, or outlined with one or more other colors. In the example of FIG. 4B, information about the status of the application corresponding to application display element 312' is presented in application status region 324.

Figure 4C:
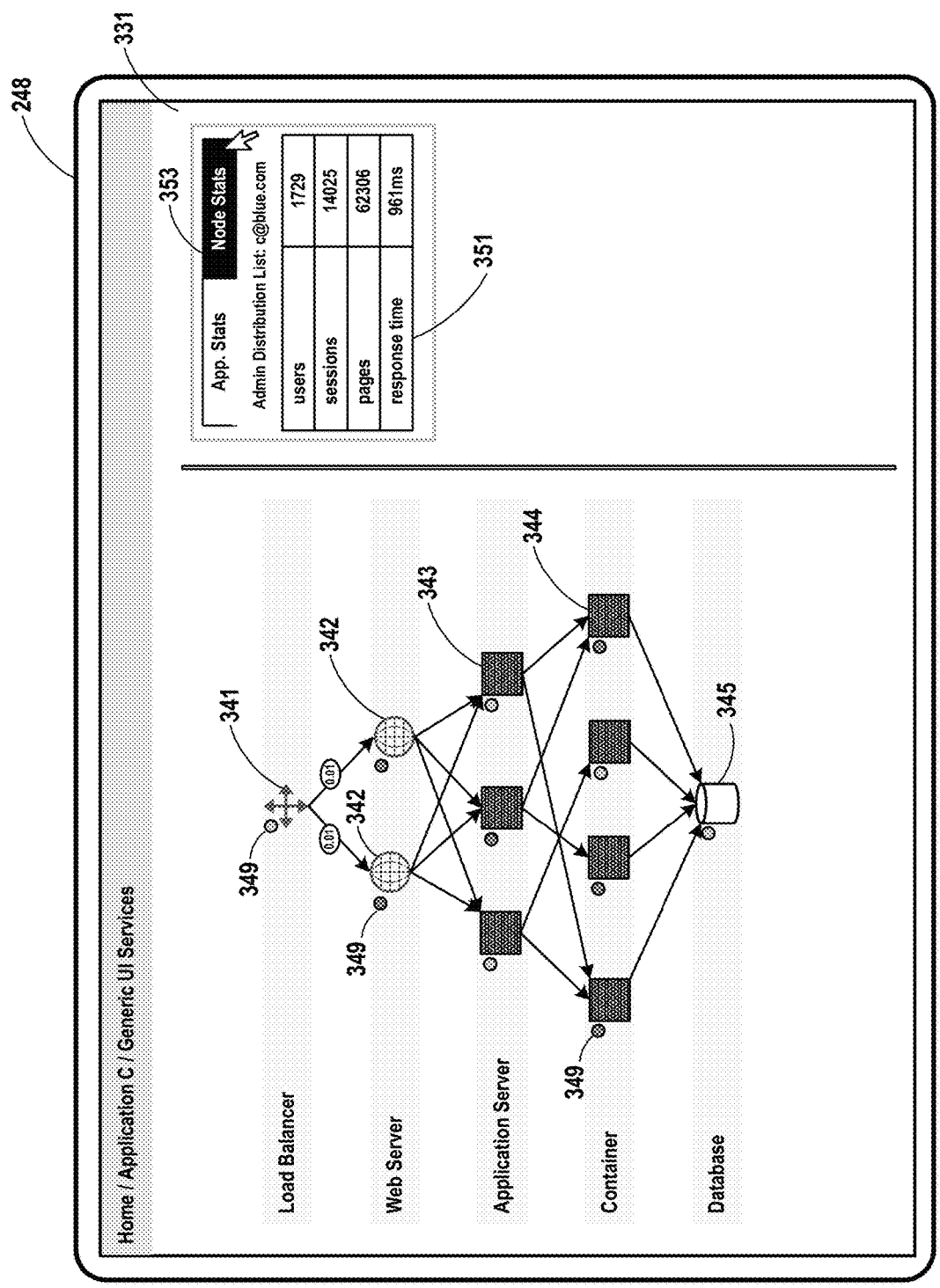

FIG. 4C is an example user interface illustrating a hierarchical view of one or more of the services of FIG. 4B, in accordance with one or more aspects of the present disclosure. User interface 331 of FIG. 4C may be presented at a display device associated with client device 230 of FIG. 2. For instance, referring again to FIG. 2 and FIG. 4B, input device 247 detects input that dashboard module 252 determines corresponds to selection of service 322' within user interface 321. Dashboard module 252 causes communication unit 235 to output a signal over network 105. Communication unit 215 of central monitoring system 210 detects a signal that dashboard module 226 determines corresponds to a request to present a hierarchical view of the services associated with service 322'. Dashboard module 226 collects information from data store 221. Dashboard module 226 causes communication unit 215 to output a signal over network 105 that includes information derived from data store 221. Communication unit 235 of client device 230 detects a signal that dashboard module 252 determines includes information sufficient to generate user interface data. Dashboard module 252 generates the user interface data and causes user interface module 251 to present user interface 331 at display 248, as illustrated in FIG. 4C.

In FIG. 4C, user interface 331 illustrates various nodes arranged in a hierarchical display. For example, in FIG. 4C, load balancer 341 is illustrated as load balancing across two web server nodes 342. Web server nodes 342 route requests to three application server nodes 343, which include a number of container nodes 344, which each access context node 345. Each of load balancer 341, web server nodes 342, application server nodes 343, container nodes 344, and context node 345 may be illustrated with one or more status indicators, which may include a colored dot (e.g., colored dot 349), an icon, highlight color, or other suitable status representation. As with other figures described herein, nodes that are fully available may be colored, highlighted or outlined with green, those that are partially available may be outlined with yellow, those that are unavailable or inoperable may be outlined with red. Nodes in standby mode, in maintenance mode, or not yet brought online might be represented, colored, highlighted, or outlined with one or more other colors. In FIG. 4C, application statistics are included within user interface 331, and are illustrated in application statistics region 351.

In some examples, connections between nodes within a hierarchical display, such as that illustrated in FIG. 4C, may be annotated with network performance information associated with the connections. For instance, information derived from round-trip times collected through the previously-described ping utility may be superimposed on the connections between various nodes. For instance, in the example of FIG. 4C, information about network performance between load balancer 341 and each of web server nodes 342 is shown. In other examples, performance information associated with other connections between nodes may also be presented in a similar manner.

Figure 4D:
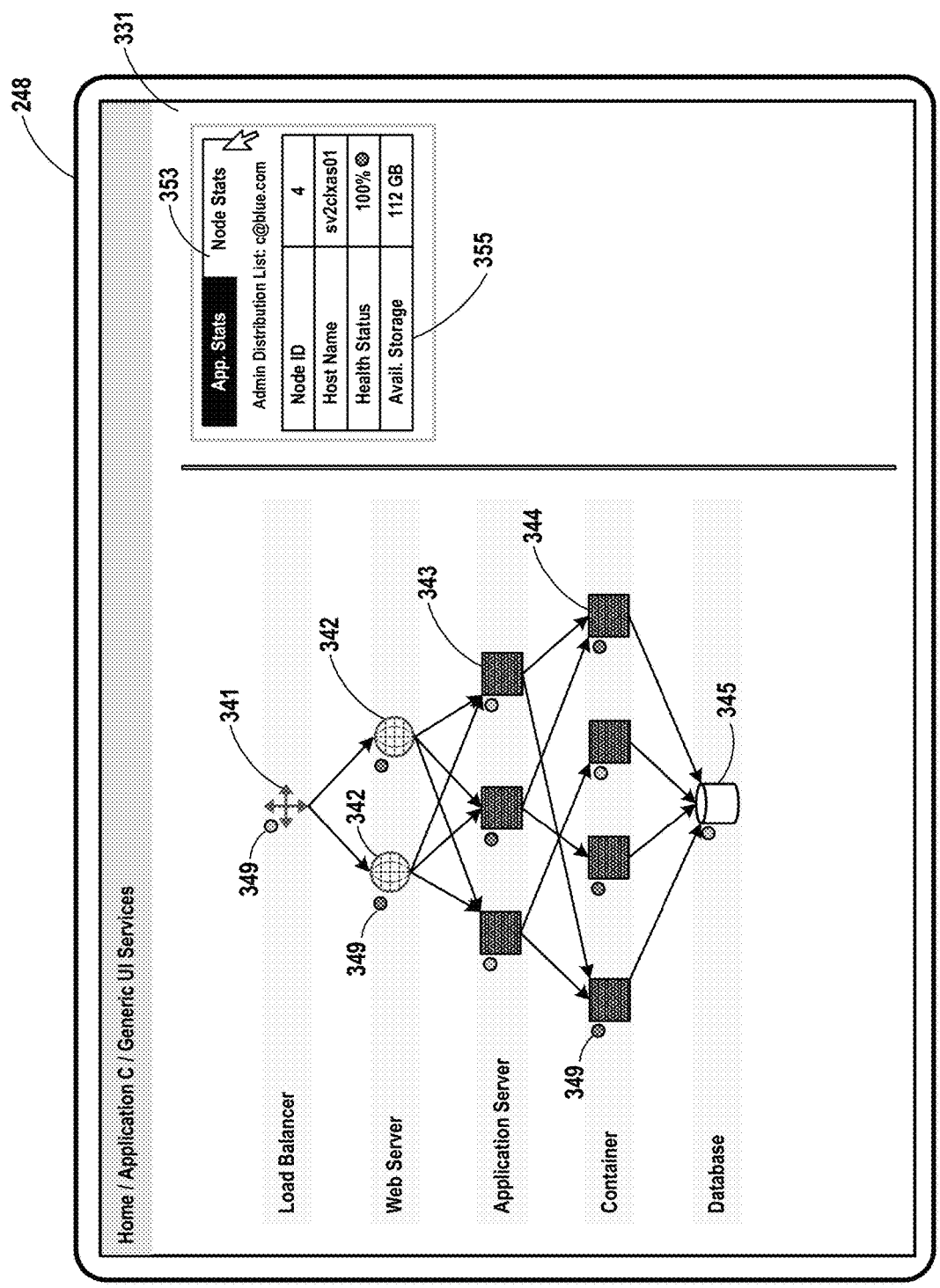

FIG. 4D illustrates a further detail view of node statistics associated a node with illustrated in FIG. 4A, in accordance with one or more aspects of the present disclosure. User interface 331 of FIG. 4C may be updated in response to user input and presented at a display device associated with client device 230 of FIG. 2. For instance, referring again to FIG. 2 and FIG. 4C, input device 247 detects input that dashboard module 252 determines corresponds to selection of tab 353 within user interface 331. In response, dashboard module 252 updates user interface 331 to present node statistics region 355 within user interface 331, as illustrated in FIG. 4D.

In FIG. 4D, user interface 331 corresponds to user interface 331 of FIG. 4C, but node statistics region 355 is presented in place of application statistics region 351. Although node statistics region 355 is described as being presented in response to detecting a selection of tab 353, in other examples, node statistics region 355 may be presented in response to detecting a selection of one of the nodes presented within user interface 331. For example, input device 247 may detect input that dashboard module 252 determines corresponds to selection of one of application server nodes 343. In response, dashboard module 252 may update user interface 331 to present node statistics region 355, detailing information about the selected or currently active application server node 343.

Figure 4E:
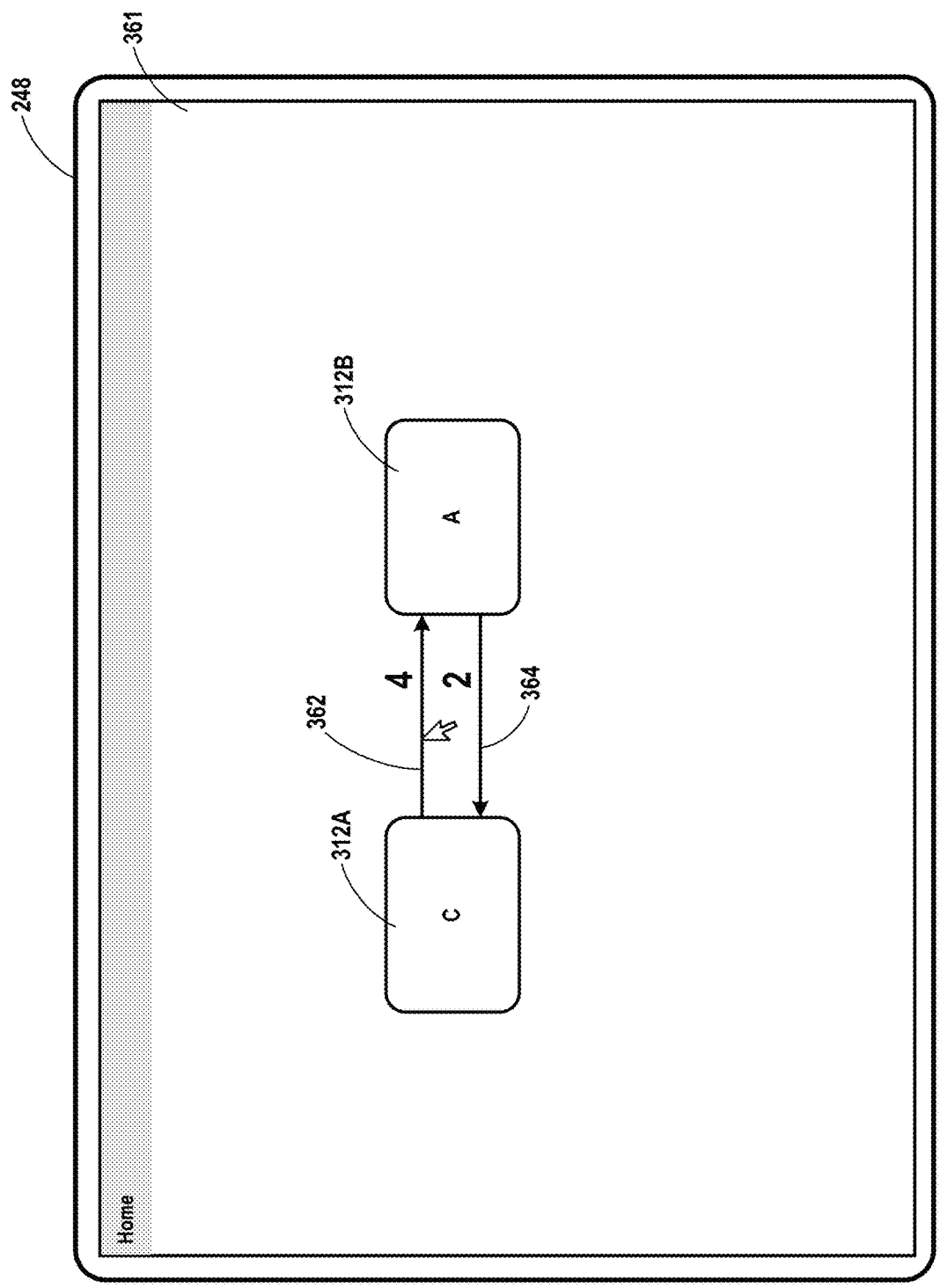

FIG. 4E illustrates a further detail view of communications between two or more applications illustrated in FIG. 4A, in accordance with one or more aspects of the present disclosure. User interface 361 of FIG. 4E may be presented at a display device associated with client device 230 of FIG. 2. For instance, referring again to FIG. 2 and FIG. 4A, input device 247 detects input that dashboard module 252 determines corresponds to selection of connection display element 314' within user interface 311. Dashboard module 252 causes communication unit 235 to output a signal over network 105. Communication unit 215 of central monitoring system 210 detects a signal that dashboard module 226 determines corresponds to a request to present information about communications between two applications shown connected by connection display element 314'. Dashboard module 226 causes communication unit 215 to output a signal over network 105. Communication unit 235 of client device 230 detects a signal that dashboard module 252 determines includes information sufficient to generate user interface data for presentation by a user interface device. Dashboard module 252 generates the user interface data and causes user interface module 251 to present user interface 361 at display 248, as illustrated in FIG. 4E.

In FIG. 4E, user interface 361 illustrates connections between two application display elements. As shown, application display element 312A communicates four types of information to the application corresponding to application display element 312B. Application display element 312B communicates two types of information to the application corresponding to application display element 312A. Connections between application display element 312A and application display element 312B may be color-coded to indicate the aggregate status of the communications paths illustrated. The communication paths may be illustrated with green, yellow, and red to indicate available, partially available, and unavailable paths, respectively. Paths in standby mode, in maintenance mode, or not yet brought online might each be represented with a different color.

Figure 4F:
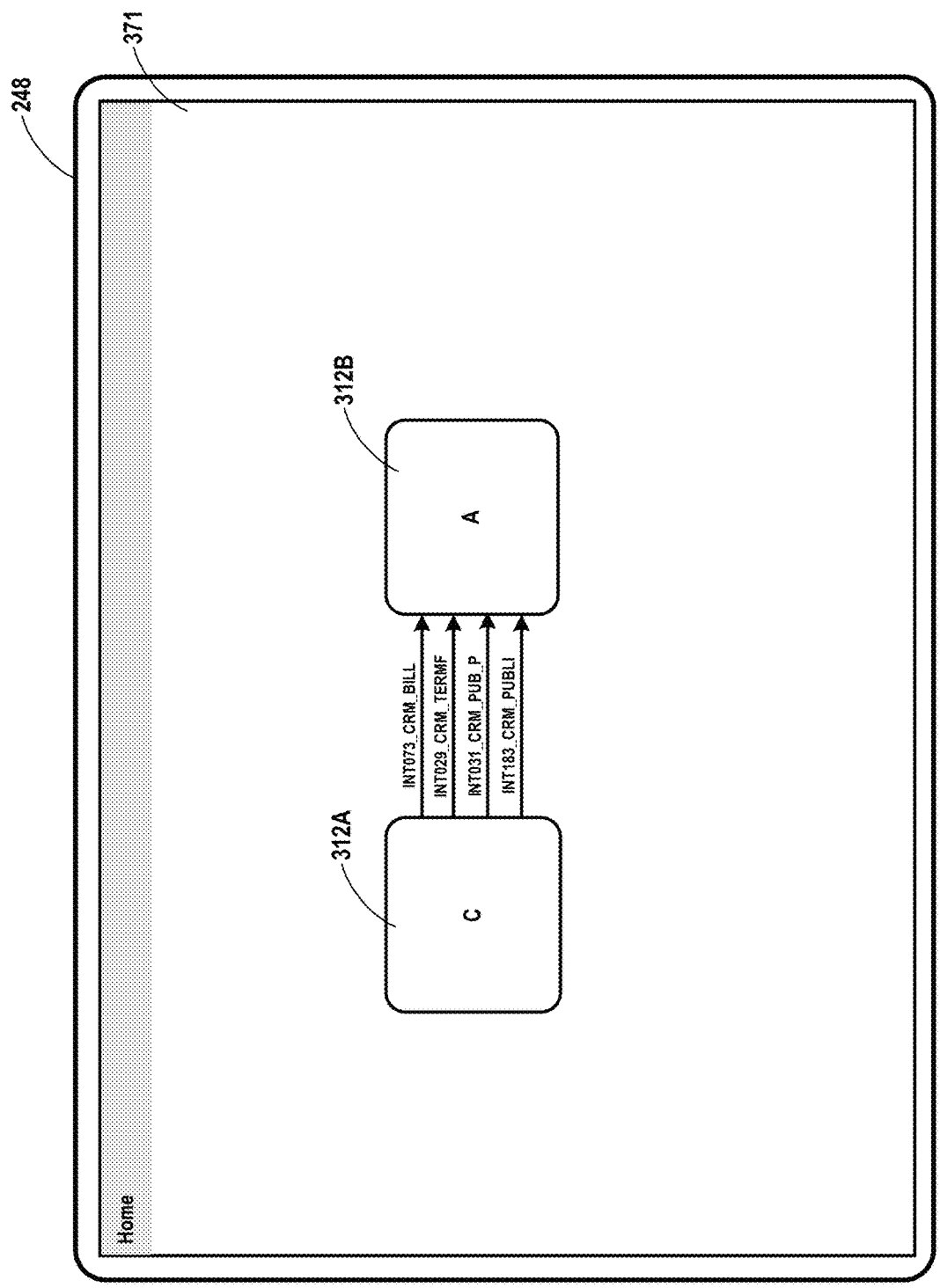

FIG. 4F illustrates a more detailed view of the communications illustrated in FIG. 4E, in accordance with one or more aspects of the present disclosure. User interface 371 of FIG. 4F may be presented at a display device associated with client device 230 of FIG. 2. For instance, referring again to FIG. 2 and FIG. 4E, input device 247 detects input that dashboard module 252 determines corresponds to selection of connection 362 within user interface 361. Dashboard module 252 causes communication unit 235 to output a signal over network 105. Communication unit 215 of central monitoring system 210 detects a signal that dashboard module 226 determines corresponds to a request to present further information about communications between two applications shown connected by connection 362. Dashboard module 226 causes communication unit 215 to output a signal over network 105. Communication unit 235 of client device 230 detects a signal that dashboard module 252 determines includes information sufficient to generate user interface data. Dashboard module 252 generates the user interface data and causes user interface module 251 to present user interface 371 at display 248, as illustrated in FIG. 4F.

In FIG. 4F, user interface 371 illustrates further details corresponding to connection 362 as presented within user interface 361. In user interface 371, each of the four connections corresponding to connection 362 is labeled to identify the information, signals, and/or types of information communicated between applications corresponding to application display element 312A to application display element 312B. The individual connections between application display element 312A and application display element 312B shown within user interface 371 may be color-coded to indicate the status of the individual communications paths illustrated.

Figure 4G:
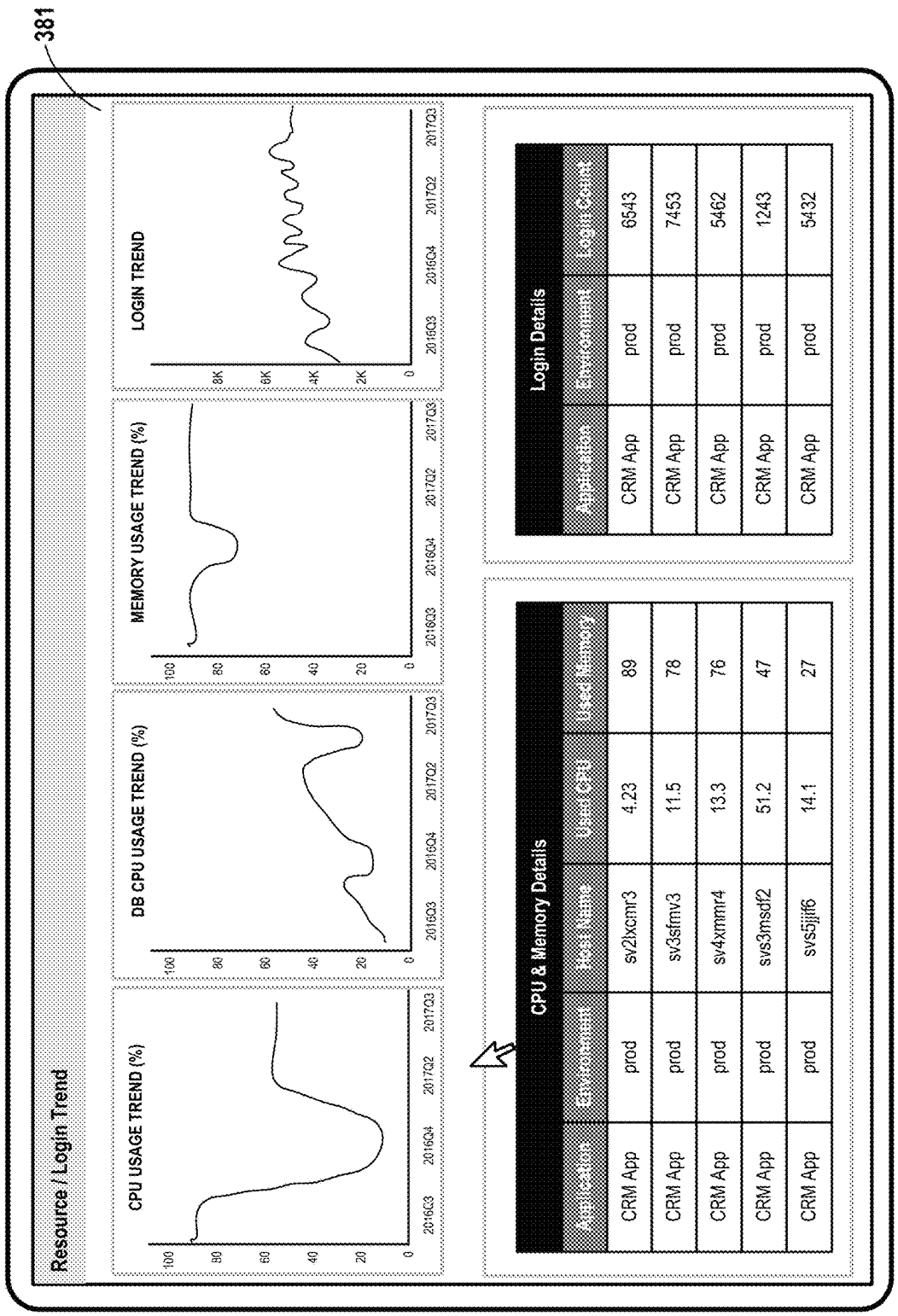

FIG. 4G is an example user interface illustrating infrastructure metrics, resource utilization statistics, trends, and other information about a computing infrastructure, in accordance with one or more aspects of the present disclosure. User interface 381 may be presented at a display device associated with client device 230 of FIG. 2. For instance, with reference to FIG. 2, input device 247 detects input and outputs to user interface module 251 an indication of input. User interface module 251 outputs information about the input to dashboard module 252. Dashboard module 252 determines that the input corresponds to a request to present information about infrastructure utilization within a datacenter, cluster, or platform. Dashboard module 252 causes communication unit 235 to output a signal over network 105. Communication unit 215 of central monitoring system 210 detects a signal and outputs to dashboard module 226 information about the signal. Dashboard module 226 determines that the signal corresponds to a request to present a dashboard view of utilization statistics associated with host 270 or a data center that includes host 270. Dashboard module 226 causes communication unit 215 to output a signal over network 105. Communication unit 235 of client device 230 detects a signal and outputs to dashboard module 252 information about the signal. Dashboard module 252 determines that the signal includes information sufficient to generate user interface data for presentation by a user interface device. Dashboard module 252 generates the user interface data and causes user interface module 251 to present user interface 381 at display 248, as illustrated in FIG. 4G.

In FIG. 4G, user interface 381 includes information about CPU, database, and memory usage trends for a particular application (e.g., application C), in a particular environment, and across all hosts on which that application executes. User interface 381 further includes information about login trends and login details. For some trend data, as shown in FIG. 4G, information is presented on a quarterly basis, but more frequent (or less frequent) trend data may be presented in other user interfaces.

Figure 4H:
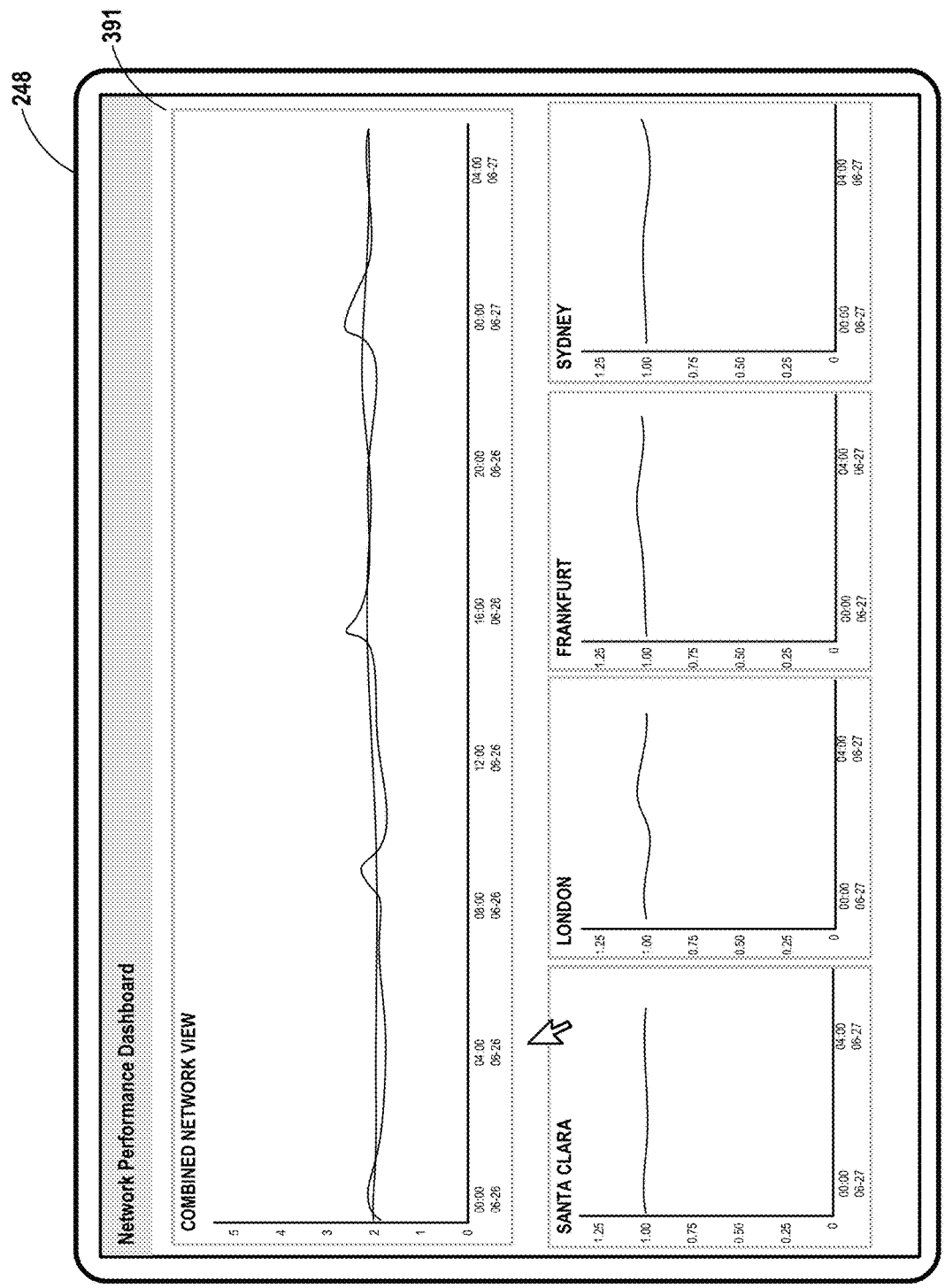

FIG. 4H is an example user interface illustrating network performance information for multiple geographical locations, in accordance with one or more aspects of the present disclosure. User interface 391 may be presented at a display device associated with client device 230 of FIG. 2. For instance, with reference to FIG. 2, input device 247 detects input that dashboard module 252 determines corresponds to a request to present information about network performance. Dashboard module 252 causes communication unit 235 to output a signal over network 105. In response, dashboard module 252 receives an indication of a response from communication unit 235. Dashboard module 252 determines that the response includes information from central monitoring system 210 relating to a user interface. Dashboard module 252 uses the information to present user interface 391 at display 248, as illustrated in FIG. 4H.

In FIG. 4H, user interface 391 includes information about the average network timing measurements, for timeslots spanning multiple days. In the example shown in FIG. 4H, those time slots may be on the order of hours, but other timeframes are possible. FIG. 4H shows both a combined view and views for each geographical location. The graphs shown illustrate network performance, over time, for the combined region and each respective geographical location.

Figure 4I:
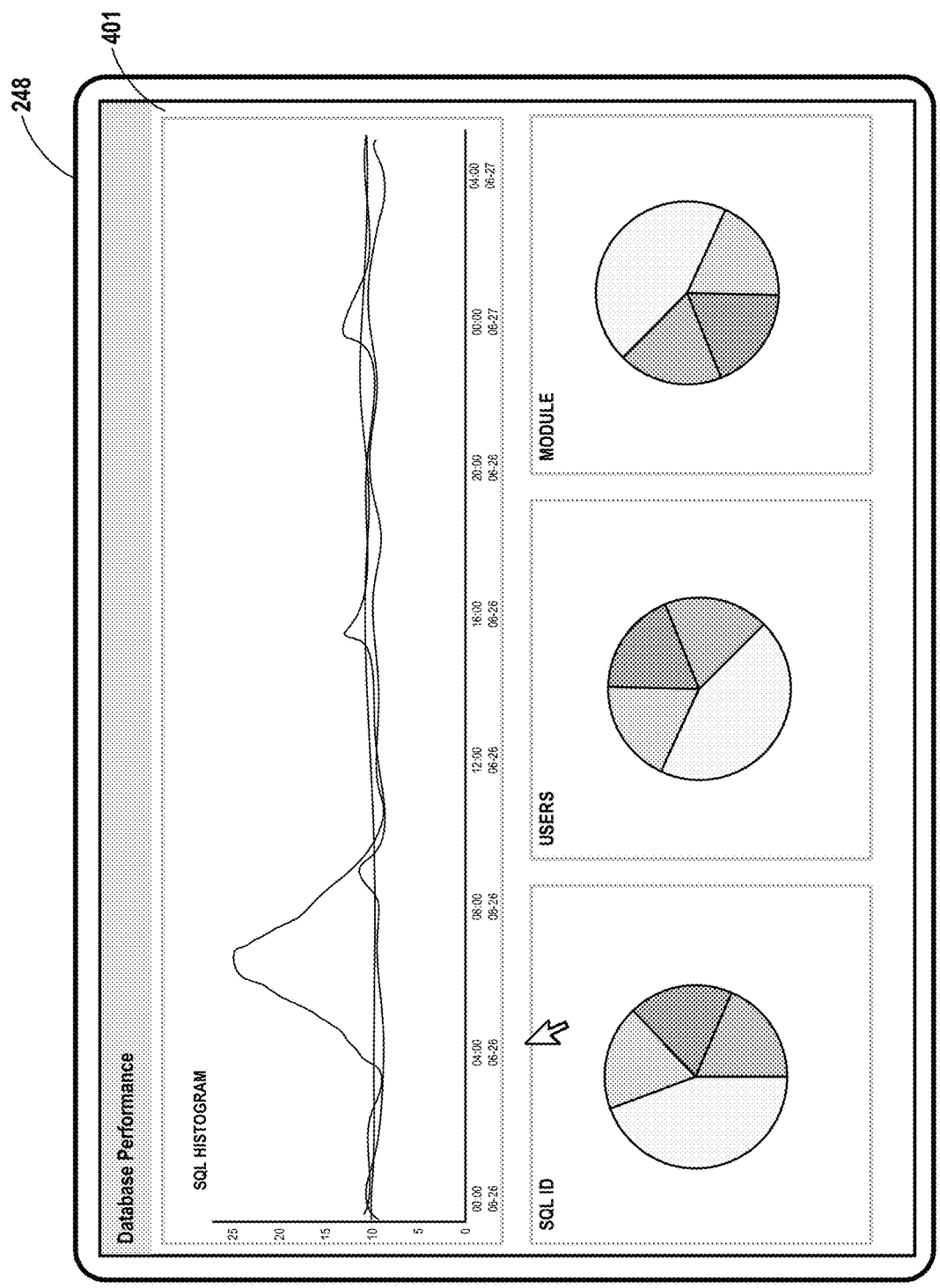

FIG. 4I is an example user interface illustrating a database query histogram, in accordance with one or more aspects of the present disclosure. User interface 401 may be presented at a display device associated with client device 230 of FIG. 2. For instance, with reference to FIG. 2, input device 247 detects input that dashboard module 252 determines corresponds to a request to present information about database performance. Dashboard module 252 causes communication unit 235 to output a signal over network 105, and receives an indication of a response. Dashboard module 252 determines that the response includes information from central monitoring system 210 relating to a user interface. Dashboard module 252 uses the information to present user interface 401 at display 248, as illustrated in FIG. 4I.

In FIG. 4I, user interface 401 includes a database operation histogram (or SQL histogram) that shows the number of operations performed by a selected database during specific time windows. In some examples, the number of SQL queries for each consecutive ten-minute time window may be shown. As illustrated in FIG. 4H, over the course of the several days, as many as approximately 25 SQL queries are performed by the selected database in a given time window (e.g., a ten-minute window). In other examples, the data illustrated in FIG. 4H can be further filtered in response to user input, so that the histogram shows only those queries that take longer than a threshold amount of time. In such an example, only queries taking longer than, for example, 20 seconds might be represented in the histogram.

Figure 4J:
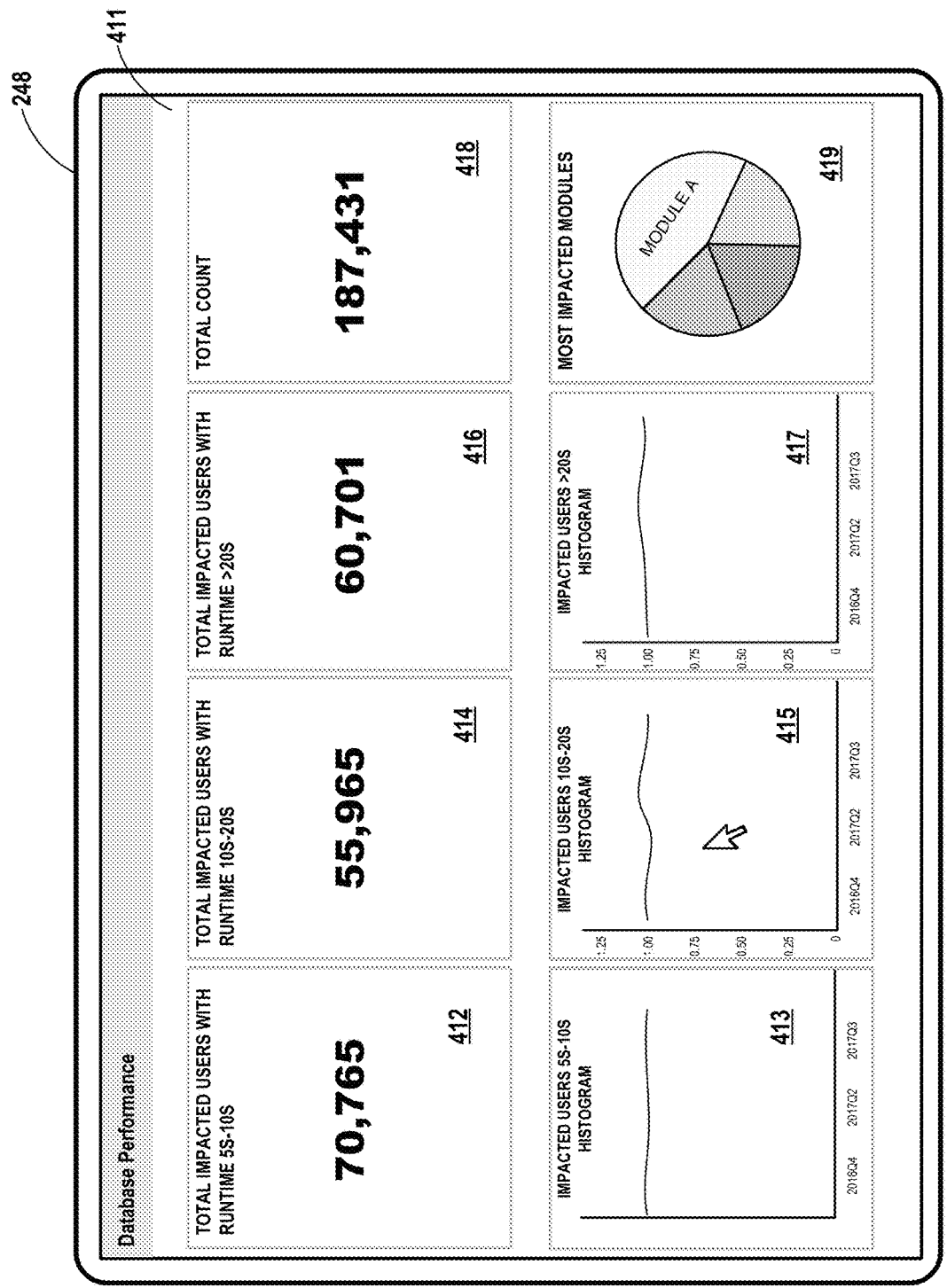

FIG. 4J is an example user interface illustrating a database query impact dashboard, in accordance with one or more aspects of the present disclosure. User interface 411 may be presented at a display device associated with client device 230 of FIG. 2. For instance, with reference to FIG. 2, input device 247 detects input that dashboard module 252 determines corresponds to a request to present information about the impact that query performance has on users and/or applications. Dashboard module 252 causes communication unit 235 to output a signal over network 105, and receives from communication unit 235 an indication of a response from communication unit 235. Dashboard module 252 determines that the response includes information from central monitoring system 210 relating to a user interface. Dashboard module 252 uses the information to present user interface 411 at display 248, as illustrated in FIG. 4J.

In FIG. 4J, user interface 411 includes information about the impact that certain database queries may have within systems 200. For example, in FIG. 4J, user interface 411 reports, through tile 412, the number of users that are impacted by queries that take between 5 and 10 seconds (i.e., runtimes between 5 and 10 seconds). Histogram 413 illustrates a time-based histogram illustrating the number of users impacted by queries with runtimes between 5 and 10 seconds. Tile 414 reports the number of users that are impacted by queries with runtimes between 10 and 20 seconds. Histogram 415 illustrates a time-based histogram illustrating the number of users impacted by queries with runtimes between 10 and 20 seconds. Tile 416 reports the number of users that are impacted by queries with runtimes greater than 20 seconds. Histogram 417 illustrates a time-based histogram illustrating the number of users impacted by queries with runtimes greater than 20 seconds. Tile 418 reports the total number of users that are impacted by queries with runtimes greater than 5 seconds, and chart 419 illustrates a chart of the modules, applications, and/or processes correlated with those queries.

Figure 5A:
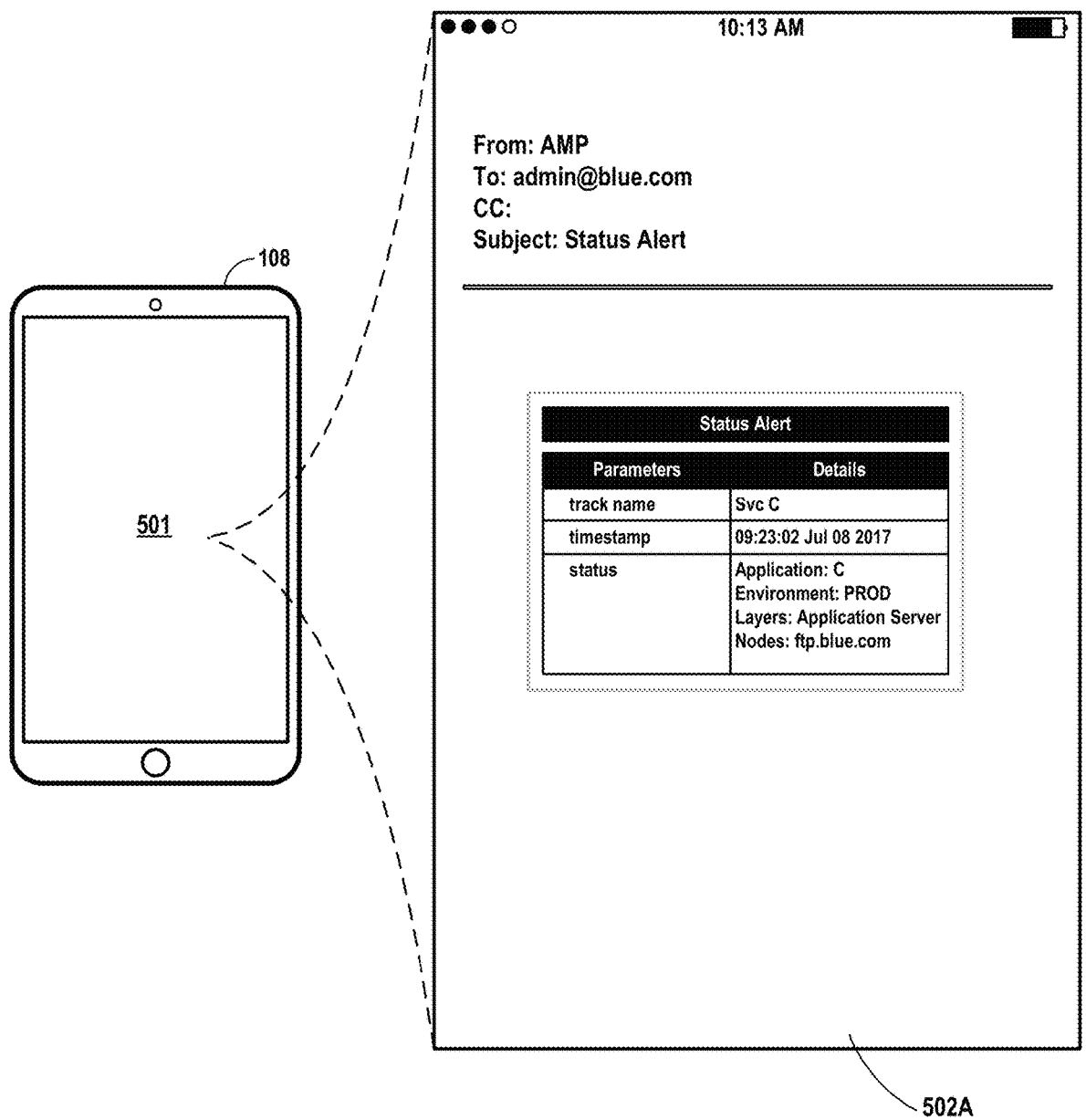
FIG. 5A, FIG. 5B, and FIG. 5C are conceptual diagrams illustrating example alert user interfaces presented by an example mobile device in accordance with one or more aspects of the present disclosure.
Figure 5B:
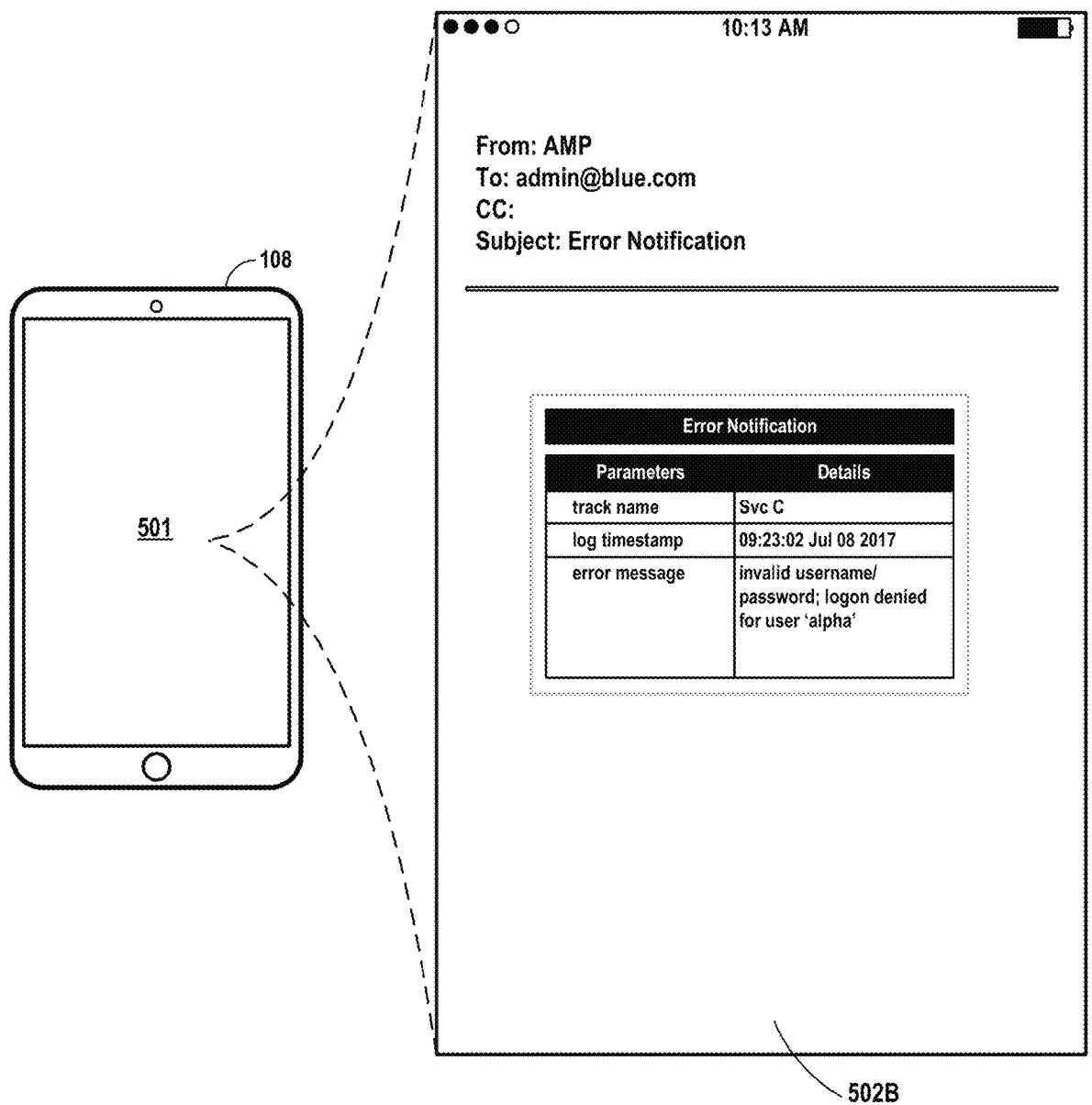
Figure 5C:
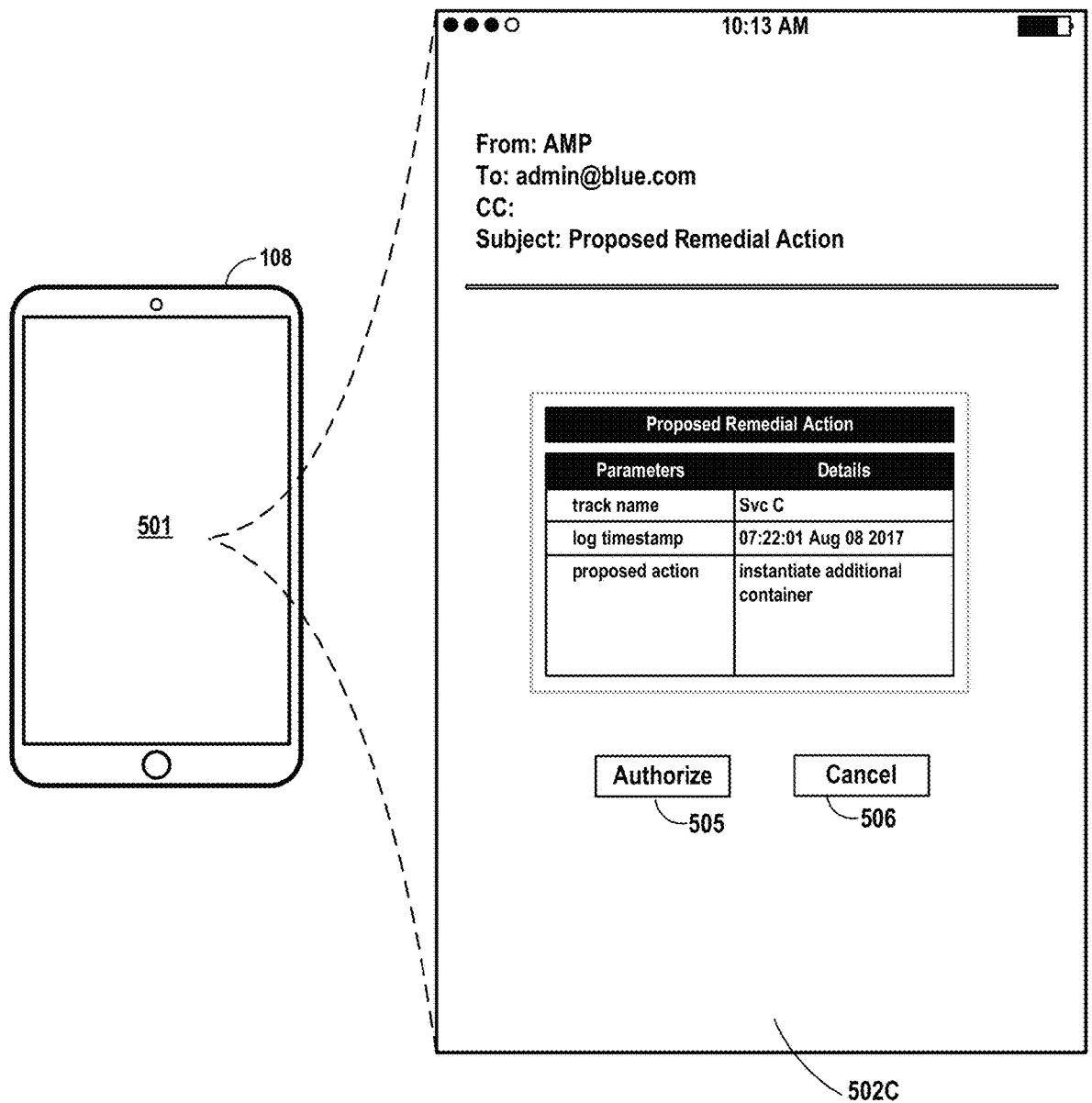

FIG. 5A, FIG. 5B, and FIG. 5C are conceptual diagrams illustrating example user interfaces presented by an example mobile device in accordance with one or more aspects of the present disclosure. User interfaces illustrated in FIG. 5A, FIG. 5B, and FIG. 5C may correspond to a user interface presented by mobile device 108 of FIG. 1A and FIG. 2. One or more aspects of the user interfaces illustrated in FIG. 5A, FIG. 5B, and FIG. 5C may be described herein within the context of system 100 of FIG. 1A, FIG. 1B, and/or FIG. 2. Although the user interfaces illustrated in FIG. 5A, FIG. 5B, and FIG. 5C are shown as graphical user interfaces, other types of interfaces may be presented by mobile device 108, including a text-based user interface, a console or command-based user interface, a voice prompt user interface, or any other appropriate user interface now known or hereinafter developed.

FIG. 5A is an example user interface illustrating an alert presented by a mobile device in response to a status change detected by one or more monitoring agents, in accordance with one or more aspects of the present disclosure. For instance, with reference to FIG. 2, monitoring agent 282 determines that one or more containers 286 has stopped operating correctly and/or has undergone some other status change. Monitoring agent 282 accesses information stored in data store 283 and performs an impact analysis of the status change based on the criticality of the affected node(s). Monitoring agent 282 determines that the impact of the status is such an alert should be sent to one or more devices monitored by network administrators or stakeholders. Monitoring agent 282 causes communication unit 275 to output a signal over network 105. Mobile device 108 detects a signal over network 105 and determines that the signal includes information sufficient to generate user interface data for presentation by a user interface device. Mobile device 108 generates the user interface data and presents user interface 502A at display 501 as illustrated in FIG. 5A. User interface 502A includes information about the status change affecting one or more nodes, such as one or more containers 286. User interface 502A may be presented in the form of an email or other communication received by mobile device 108.

FIG. 5B is an example user interface illustrating an alert presented by a mobile device in response to an error condition logged by one or more monitoring agents, in accordance with one or more aspects of the present disclosure. For instance, with reference to FIG. 2, monitoring agent 282 determines that logged data at host 270 includes one or more error conditions. Monitoring agent 282 analyzes the logged data and performs an impact analysis based on the criticality of the nodes associated with the log entries. Monitoring agent 282 determines that the impact of the error condition is such an alert should be sent to one or more devices monitored by network administrators. Monitoring agent 282 causes communication unit 275 to output a signal over network 105. Mobile device 108 detects a signal over network 105 and determines that the signal includes information sufficient to generate user interface data for presentation by a user interface device. Mobile device 108 generates the user interface data and presents user interface 502B at display 501 as illustrated in FIG. 5B. User interface 502B includes information about the error condition in the logged data affecting one or more nodes and/or components of host 270. As with user interface 502A, user interface 502B may be presented in the form of an email or other communication received by mobile device 108.

FIG. 5C is an example user interface illustrating a request for authorization, presented by a mobile device, to perform an action to adjust, improve, and/or optimize one or more aspects of a computing infrastructure, in accordance with one or more aspects of the present disclosure. For instance, with reference to FIG. 2, optimization module 225 determines, based on monitored information collected by monitoring agent 282 or otherwise, that aspects of host 270 are experiencing high utilization. Optimization module 225 correlates the monitoring information to one or more applications executing on host 270. Optimization module 225 identifies an application or process associated with the high utilization levels. Optimization module 225 determines that an appropriate remedial action to address the high utilization levels includes instantiating or spinning up an additional container. Optimization module 225 causes communication unit 215 to output a signal over network 105. Communication unit 235 of client device 230 detects a signal over network 105 and determines that the signal includes information sufficient to generate user interface data for presentation by a user interface device. Mobile device 108 generates the user interface data and presents user interface 502C at display 501 as illustrated in FIG. 5C. User interface 502C includes information about a proposed remedial action to address high utilization at host 270, and a prompt to authorize the performance of the remedial action. As with user interface 502A and user interface 502B, user interface 502C may be presented in the form of an email or other communication received and/or presented by mobile device 108.

Central monitoring system 210 may, in response to selection of authorize button 505, cause the remedial action to be performed. For instance, in the example of FIG. 5C, and with reference to FIG. 2, input device 247 of client device 230 detects input that it determines corresponds to selection, by a user, of authorize button 505 within user interface 502C. User interface module 251 causes communication unit 235 to output a signal over network 105. Communication unit 215 of central monitoring system 210 detects input over network 105 and outputs to optimization module 225 information about the signal. Optimization module 225 determines that the signal corresponds to authorization to perform the proposed remedial action. Optimization module 225 causes communication unit 215 to output a signal over network 105. In response to detecting a signal over network 105, host 270 performs the proposed action. In examples where client device 230 detects selection of cancel button 506 of FIG. 5C, the proposed action might not be performed.

Figure 6:
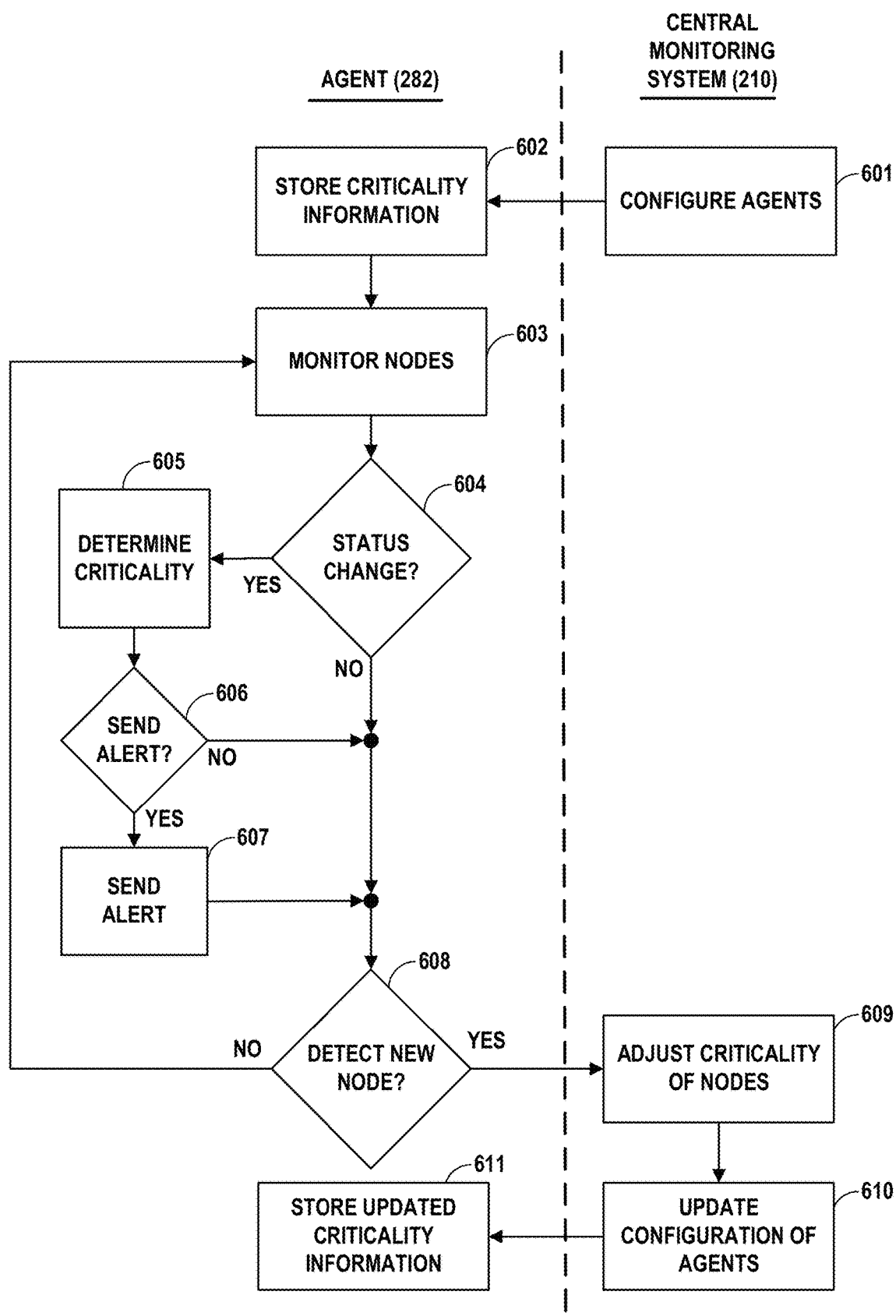
FIG. 6 is a flow diagram illustrating an example process for performing tasks in accordance with one or more aspects of the present disclosure.

FIG. 6 is a flow diagram illustrating an example process for performing tasks in accordance with one or more aspects of the present disclosure. The process of FIG. 6 is illustrated from two different perspectives: operations performed by an example monitoring agent 282 (left-hand column to the left of dashed line), and operations performed by an example central monitoring system 210 (right-hand column to the right of dashed line). In the example of FIG. 6, the illustrated process may be performed by system 200 in the context illustrated in FIG. 2. In other examples, different operations may be performed, or operations described in FIG. 6 as being performed by a particular component, module, system, and/or device may be performed by one or more other components, modules, systems, and/or devices. Further, in other examples, operations described in connection with FIG. 6 may be performed in a difference sequence, merged, or omitted, even where such operations are shown performed by more than one component, module, system, and/or device.

In the example of FIG. 6, and in accordance with one or more aspects of the present disclosure, central monitoring system 210 may configure monitoring agents 282 (601). For instance, in the example of FIG. 2, central monitoring system 210 may communicate over network 105 with one or more monitoring agents 282 executing on hosts 270 and provide information relating to the criticality of one or more nodes executing on host 270.

Monitoring agent 282 may store criticality information (602). For instance, in the example of FIG. 2, monitoring agent 282 may store information received from central monitoring system 210 in data store 283.

Monitoring agent 282 may monitor one or more nodes (603). For instance, still referring to FIG. 2, monitoring agent 282 may monitor one or more of the ports, URLs, processes, containers, virtual machines, network components, and other aspects of host 270.

Monitoring agent 282 may detect a status change (604). For instance, monitoring agent 282 may determine that one or more of the containers executing on host 270 has stopped operating correctly, is no longer operable, and/or has undergone some other status change.

Monitoring agent 282 may determine the criticality of the status change (605). For instance, monitoring agent 282 may determine, based on the criticality information stored in data store 283, that the status change impacts system 200 to such an extent that an alert should be sent (606). Monitoring agent 282 may send an alert notifying a network administrator of the status change (607). Alternatively, monitoring agent 282 may determine that the criticality of the status change is such that an alert should not be sent.

Monitoring agent 282 may detect that a new node has been added to system 200 (608). For instance, monitoring agent 282 may determine, during the course of monitoring aspects of host 270, that a new container has been instantiated on host 270 or on another host. Monitoring agent 282 may automatically communicate information about the new node to central monitoring system 210.

Central monitoring system 210 may determine the effect of the new node being added to system 200, and adjust the criticality of nodes within system 200 (609). For instance, central monitoring system 210 may analyze a set of default or customized rules or templates for rules to classify the new node. In some examples, a set of rules are predefined for one or more nodes (e.g., Tomcat, Apache web server), so that central monitoring system 210 is able to determine if the new node can be classified according to one or more of the predefine nodes rule sets.

Central monitoring system 210 may communicate with monitoring agent 282 to update the configuration of monitoring agent 282 in light of the adjustments to the criticality of the nodes resulting from the addition of the new node (610). Monitoring agent 282 may store the updated criticality information (611). For instance, monitoring agent 282 may store the information in data store 283.

Figure 7:
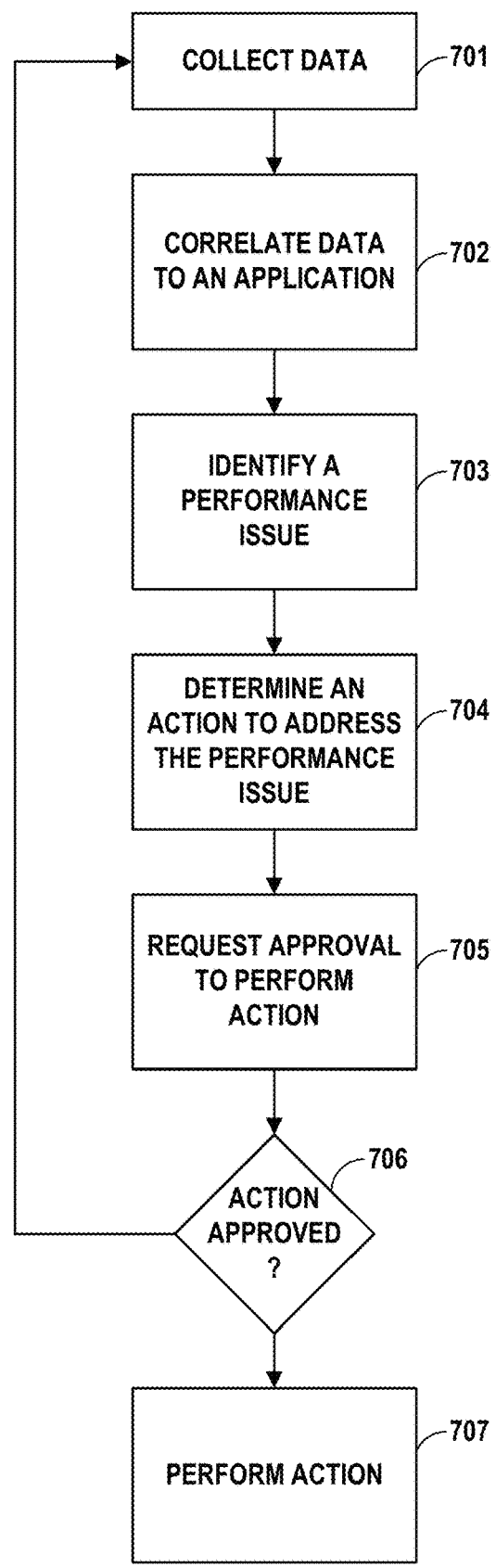
FIG. 7 is a flow diagram illustrating operations performed by an example central monitoring system in accordance with one or more aspects of the present disclosure.

FIG. 7 is a flow diagram illustrating operations performed by an example central monitoring system in accordance with one or more aspects of the present disclosure. FIG. 7 is described below within the context of central monitoring system 110 of FIG. 1A. In other examples, operations described in FIG. 7 may be performed by one or more other components, modules, systems, or devices. Further, in other examples, operations described in connection with FIG. 7 may be merged, performed in a difference sequence, or omitted.

In the example of FIG. 7, and in accordance with one or more aspects of the present disclosure, central monitoring system 110 may collect data (701). For instance, in an example that can be described in connection with FIG. 1A, central monitoring system 110 collects information from monitoring agents executing on load balancer 150, web servers 160, application servers 170, and/or databases 180. Accordingly, central monitoring system 110 may collect data associated with a plurality of service layers in platform 140A, including load balancing layer 191 through database layer 195 as illustrated in FIG. 1C. Central monitoring system 110 may alternatively, or in addition, collect information from other sources, such as third-party monitoring sources or other monitoring tools. Central monitoring system 110 may associate information collected from such other sources with one or more service layers, such as load balancing layer 191 through database layer 195 illustrated in FIG. 1C.

Central monitoring system 110 may correlate data to an application (702). For instance, in the example of FIG. 1A, central monitoring system 110 determines which of the applications executing within platform 140A is associated with the data collected by central monitoring system 110. In some examples, central monitoring system 110 maintains a database or data structure for use in identifying which applications are associated with the collected data. In examples where a database is used, such a database may include the following tables:

EQX_MPT_APPLICATION (holds application level information)

EQX_MPT_ENVIRONMENT (holds application's environment level details)

EQX_MPT_SERVICE (holds the service details of an environment)

EQX_MPT_LAYER (holds the layer details of a service)

EQX_MPT_NODE (holds the node level information of a particular layer)

When an application is deployed or on-boarded within one or more of platforms 140, these tables get populated by agents (e.g., agents 282 or agents 293) configured to automatically discover new services starting on a host, as previously described. The data collected that relates to infrastructure, network, and database functionality is then correlated to an application through these tables.

For collected data relating to infrastructure, an agent running on a particular host/VM reads all the nodes associated with that host/VM from the node table (which in turn is mapped to the application through above table hierarchy) and checks the availability of all the nodes and updates the node table. For data collected relating to one or more networks, a ping utility (which may be integrated into an agent) reads the Layer/Node data from the DB, captures RTT (Round Trip Time) between mutually associated layers/nodes and updates the corresponding tables. For data collected relating to database functionality, custom built database scripts are first executed against all the Database nodes available in the Node table. Then the results are captured and tagged against each Database node which is in-turn mapped to an application/service.

Central monitoring system 110 may determine, for example, that some or all of the data collected from platform 140A is associated with (e.g., generated by, processed by, or used as input by) a customer relationship management application executing across load balancing layer 191, web server layer 192, application server layer 193, container layer 194, and database layer 195 of FIG. 1C, and thereby utilizing aspects of components, modules, or devices illustrated in such layers.

Central monitoring system 110 may identify a performance issue associated with an application (703). For instance, in the example being described, central monitoring system 110 determines, based on the correlated data, that the customer relationship management application is causing high CPU utilization rates for web server 160A and web server 160B.

Central monitoring system 110 may determine an action to address the performance issue (704). For example, central monitoring system 110 determines that adding a new web server (e.g., web server 160C) to platform 140A may address and/or reduce the high CPU utilization rates for web server 160A and web server 160B.

Central monitoring system 110 may request approval to perform the action (705). For instance, continuing with the same example, central monitoring system 110 causes a signal to be sent over network 105. Mobile device 108 detects a signal over mobile device 108 and determines that the signal corresponds to a message. Mobile device 108 presents the message within user interface 109. In some examples, user interface 109 may correspond to a user prompt requesting authorization to deploy web server 160C within platform 140A.

Central monitoring system 110 may determine the action has been authorized (YES path from 706). For example, still continuing with the same example, mobile device 108 detects input that it determines corresponds to interaction with user interface 109. Mobile device 108 outputs a signal over network 105. Central monitoring system 110 detects a signal over network 105 and determines that the signal corresponds to approval to deploy web server 160C within platform 140A.

Central monitoring system 110 may perform the action to address the performance issue (707). For example, responsive to receiving approval to deploy web server 160C, central monitoring system 110 causes platform 140A to deploy web server 160C to address the performance issue associated with the customer relationship management application. In examples where central monitoring system 110 determines that the signal does not correspond to approval, central monitoring system 110 continues to collect data (NO path from 706).

For processes, apparatuses, and other examples or illustrations described herein, including in any flowcharts or flow diagrams, certain operations, acts, steps, or events included in any of the techniques described herein can be performed in a different sequence, may be added, merged, or left out altogether (e.g., not all described acts or events are necessary for the practice of the techniques). Moreover, in certain examples, operations, acts, steps, or events may be performed concurrently, e.g., through multi-threaded processing, interrupt processing, or multiple processors, rather than sequentially. Further certain operations, acts, steps or events may be performed automatically even if not specifically identified as being performed automatically. Also, certain operations, acts, steps, or events described as being performed automatically may be alternatively not performed automatically, but rather, such operations, acts, steps, or events may be, in some examples, performed in response to input or another event.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

In accordance with one or more aspects of this disclosure, the term "or" may be interrupted as "and/or" where context does not dictate otherwise. Additionally, while phrases such as "one or more" or "at least one" or the like may have been used in some instances but not others; those instances where such language was not used may be interpreted to have such a meaning implied where context does not dictate otherwise.

In one or more examples, the functions described may be implemented in hardware, software, firmware, or any combination thereof. If implemented in software, the functions may be stored, as one or more instructions or code, on and/or transmitted over a computer-readable medium and executed by a hardware-based processing unit. Computer-readable media may include computer-readable storage media, which corresponds to a tangible medium such as data storage media, or communication media including any medium that facilitates transfer of a computer program from one place to another (e.g., pursuant to a communication protocol). In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can include RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the terms "processor" or "processing circuitry" as used herein may each refer to any of the foregoing structure or any other structure suitable for implementation of the techniques described. In addition, in some examples, the functionality described may be provided within dedicated hardware and/or software modules. Also, the techniques could be fully implemented in one or more circuits or logic elements.

The techniques of this disclosure may be implemented in a wide variety of devices or apparatuses, including a wireless handset, a mobile or non-mobile computing device, a wearable or non-wearable computing device, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperating hardware units, including one or more processors as described above, in conjunction with suitable software and/or firmware.

What is claimed is:

1. A method comprising:
    collecting, by a computing system, data associated with a plurality of service layers in a network, wherein at least some of the data is collected by a plurality of agents executing on a plurality of hosts within the network, the plurality of agents including agents executing at each of the plurality of service layers;
    correlating, by the computing system, the data to an application executing across the plurality of service layers by determining that the application is associated with the data;
    identifying, by the computing system and based on the data, usage trends for each of a plurality of metrics associated with the application executing across the plurality of service layers; and
    outputting, by the computing system, a user interface illustrating the usage trends for the plurality of metrics, wherein the user interface illustrates usage trends across the plurality of hosts within the network on which the application executes, and wherein the user interface illustrates the usage trends so that each of the plurality of metrics are visible to a user at the same time, and wherein the user interface presents information about an impact that database queries taking longer than a threshold amount of time have on the network.

2. The method of claim 1, wherein illustrating the usage trends includes:
    illustrating usage trends for each of a central processing unit (CPU) metric, a database metric, and a memory use metric.

3. The method of claim 2, wherein illustrating the usage trends includes:
    illustrating usage trends over a timespan that encompasses multiple days.

4. The method of claim 1, wherein the network spans a plurality of geographical locations, and wherein illustrating the usage trends includes:
    illustrating a quantity of users associated with database queries falling within each of a plurality of time windows representing database query latency.

5. The method of claim 1, wherein the network spans a plurality of geographical locations, and wherein illustrating the usage trends includes:
    illustrating usage trends over each of the plurality of geographical locations.

6. The method of claim 1, wherein the information about the impact includes:
    information about users affected by the database queries taking longer than the threshold amount of time.

7. The method of claim 1, wherein the user interface includes:
    a histogram of users spanning multiple days.

8. The method of claim 1, further comprising:
    performing, by the computing system, an action to remedy a performance issue by reconfiguring at least one of the service layers.

9. The method of claim 8, wherein performing the action includes:
    identifying, by the computing system and based on the correlated data, a performance issue associated with the application, wherein identifying the performance issue includes identifying a database latency caused by an inefficient database query;
    determining, by the computing system, an action to address the performance issue;
    performing, by the computing system, the action to reconfigure at least one of the service layers, wherein performing the action includes modifying the query.

10. The method of claim 8, wherein performing the action includes:
    performing a horizontal scaling of resources within the network.

11. The method of claim 8, wherein performing the action includes:
    performing a vertical scaling of resources within the network.

12. A computing system comprising a storage system and processing circuitry that has access to the storage system and is configured to:
    collect data associated with a plurality of service layers in a network, wherein at least some of the data is collected by a plurality of agents executing on a plurality of hosts within the network, the plurality of agents including agents executing at each of the plurality of service layers;
    correlate the data to an application executing across the plurality of service layers by determining that the application is associated with the data;
    identify, based on the data, usage trends for each of a plurality of metrics associated with the application executing across the plurality of service layers; and
    output a user interface illustrating the usage trends for the plurality of metrics, wherein the user interface illustrates usage trends across the plurality of hosts within the network on which the application executes, and wherein the user interface illustrates the usage trends so that each of the plurality of metrics are visible to a user at the same time, and wherein the user interface presents information about an impact that database queries taking longer than a threshold amount of time have on the network.

13. The computing system of claim 12, wherein to illustrate the usage trends, the processing circuitry is further configured to:
   illustrate usage trends for each of a CPU metric, a database metric, and a memory use metric.

14. The computing system of claim 13, wherein to illustrate the usage trends, the processing circuitry is further configured to:
   illustrate usage trends over a timespan that encompasses multiple days.

15. The computing system of claim 12, wherein the network spans a plurality of geographical locations, and wherein to illustrate the usage trends, the processing circuitry is further configured to:
   illustrate a quantity of users associated with database queries falling within each of a plurality of time windows representing database query latency.

16. The computing system of claim 12, wherein the network spans a plurality of geographical locations, and wherein to illustrate the usage trends, the processing circuitry is further configured to:
   illustrate usage trends over each of the plurality of geographical locations.

17. The computing system of claim 12, wherein the information about the impact includes:
   information about users affected by the database queries taking longer than the threshold amount of time.

18. The computing system of claim 12, wherein the user interface includes:
   a histogram of users spanning multiple days.

19. The computing system of claim 12, wherein the processing circuitry is further configured to:
   perform an action to remedy a performance issue by reconfiguring at least one of the service layers.

20. A non-transitory computer-readable storage medium comprising instructions that, when executed, configure processing circuitry of a computing system to:
   collect data associated with a plurality of service layers in a network, wherein at least some of the data is collected by a plurality of agents executing on a plurality of hosts within the network, the plurality of agents including agents executing at each of the plurality of service layers;
   correlate the data to an application executing across the plurality of service layers by determining that the application is associated with the data;
   identify, based on the data, usage trends for each of a plurality of metrics associated with the application executing across the plurality of service layers; and
   output a user interface illustrating the usage trends for the plurality of metrics, wherein the user interface illustrates usage trends across the plurality of hosts within the network on which the application executes, and wherein the user interface illustrates the usage trends so that each of the plurality of metrics are visible to a user at the same time, and wherein the user interface presents information about an impact that database queries taking longer than a threshold amount of time have on the network.

* * * * *